US011121998B2

(12) United States Patent
Cao et al.

(10) Patent No.: US 11,121,998 B2
(45) Date of Patent: Sep. 14, 2021

(54) GRAPHICAL USER INTERFACE FOR EMAIL FILE CONTENT

(71) Applicant: Citrix Systems, Inc., Fort Lauderdale, FL (US)

(72) Inventors: Lei Cao, Nanjing (CN); Jinren Zhang, Nanjing (CN)

(73) Assignee: Citrix Systems, Inc., Fort Lauderdale, FL (US)

( * ) Notice: Subject to any disclaimer, the term of this patent is extended or adjusted under 35 U.S.C. 154(b) by 0 days.

(21) Appl. No.: 16/724,588

(22) Filed: Dec. 23, 2019

(65) Prior Publication Data

US 2021/0176200 A1 Jun. 10, 2021

Related U.S. Application Data

(63) Continuation of application No. PCT/CN2019/123473, filed on Dec. 6, 2019.

(51) Int. Cl.
*H04L 12/58* (2006.01)
*G06F 40/205* (2020.01)
*G06F 3/0481* (2013.01)

(52) U.S. Cl.
CPC .......... *H04L 51/22* (2013.01); *G06F 3/04817* (2013.01); *G06F 40/205* (2020.01); *H04L 51/14* (2013.01); *H04L 51/16* (2013.01)

(58) Field of Classification Search
CPC ....... H04L 51/02; H04L 51/14; H04L 51/196; H04L 51/18; H04L 51/22; H04L 51/16; G06F 40/205; G06F 3/04817; G06Q 10/10
USPC ........................................................ 709/206
See application file for complete search history.

(56) References Cited

U.S. PATENT DOCUMENTS

| 2006/0200530 | A1* | 9/2006 | Tokuda | G06F 3/04842 |
| | | | | 709/206 |
| 2008/0162649 | A1* | 7/2008 | Lee | H04L 51/32 |
| | | | | 709/206 |
| 2010/0250685 | A1 | 9/2010 | Kunz et al. | |

(Continued)

FOREIGN PATENT DOCUMENTS

| CN | 102648462 A | 8/2012 |
| JP | 2012068906 A | 4/2012 |

OTHER PUBLICATIONS

International Search Report and Written Opinion dated Sep. 9, 2020 in International Patent Application No. PCT/CN2019/123473.

*Primary Examiner* — Glenford J Madamba
(74) *Attorney, Agent, or Firm* — Pierce Atwood LLP

(57) ABSTRACT

One disclosed method involves parsing contents of an email file to determine a first individual who sent a first email communication represented in the file and a second individual who received the first email communication, presenting, by a display screen, a graphical user interface including a graphical representation of at least the first email communication, the graphical representation including a first icon representing the first individual, a second icon representing the second individual, and a third icon representing the first email communication, determining a selection of an icon from among at least the first icon, the second icon, and the third icon, determining that at least a first portion of the contents has a first relationship with the selected icon, and presenting an indication on the display screen corresponding to the first portion.

20 Claims, 11 Drawing Sheets

(56) References Cited

U.S. PATENT DOCUMENTS

| | | | |
|---|---|---|---|
| 2014/0245178 A1* | 8/2014 | Smith | H04L 51/16 |
| | | | 715/753 |
| 2014/0330913 A1* | 11/2014 | Pascal | H04L 51/16 |
| | | | 709/206 |
| 2015/0281148 A1* | 10/2015 | Masterson | H04L 51/046 |
| | | | 715/752 |
| 2016/0283069 A1* | 9/2016 | Gupta | G06Q 10/10 |
| 2019/0132405 A1* | 5/2019 | Song | H04L 51/32 |
| 2019/0171693 A1* | 6/2019 | Dotan-Cohen | G06T 11/206 |

* cited by examiner

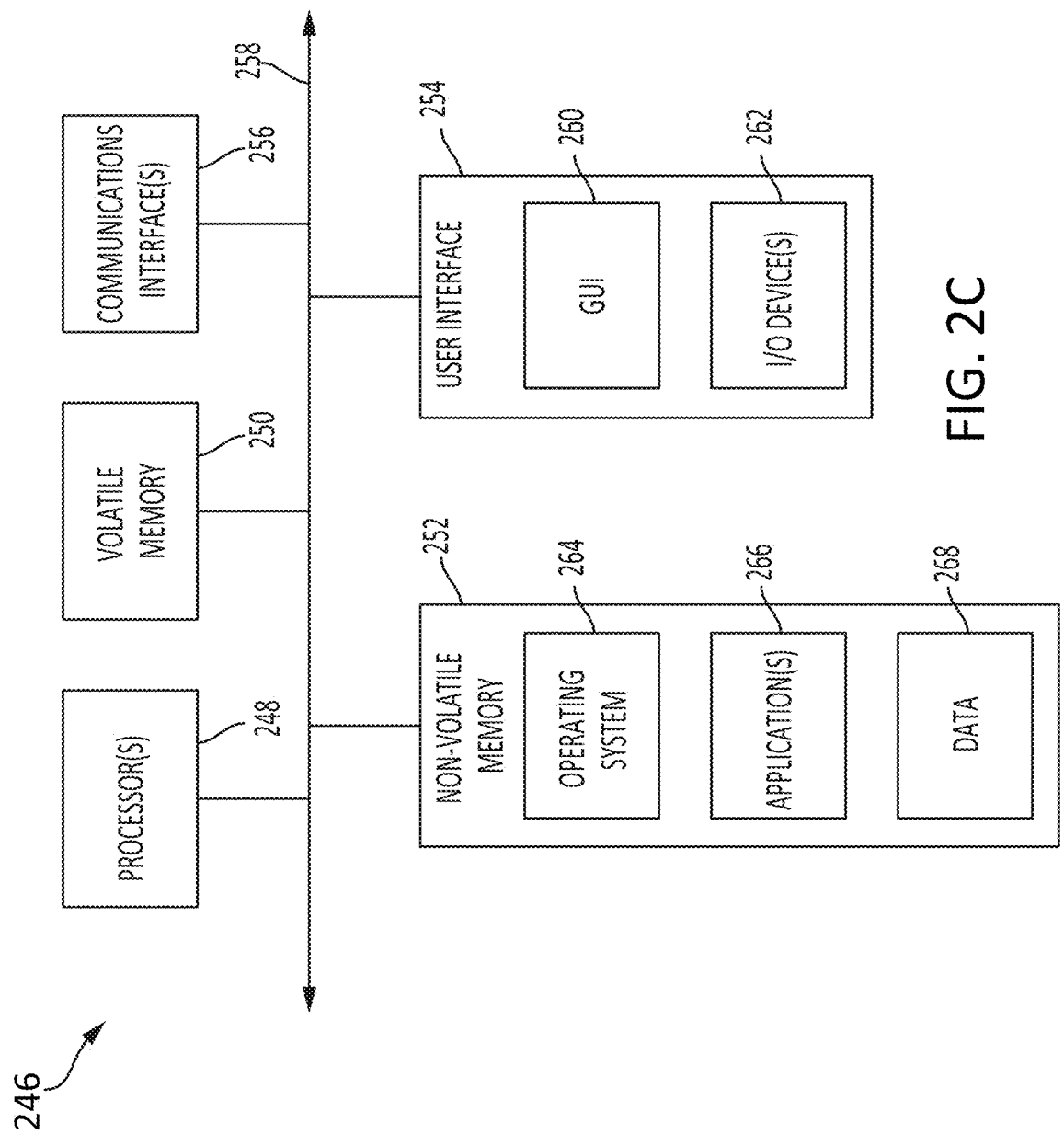

GRAPHICAL USER INTERFACE FOR EMAIL FILE CONTENT

CROSS-REFERENCE TO RELATED APPLICATIONS

This application is a continuation of and claims the benefit under 35 U.S.C. § 120 and 35 U.S.C. § 365(c) to International Application PCT/CN2019/123473, entitled GRAPHICAL USER INTERFACE FOR EMAIL FILE CONTENT, with an international filing date of Dec. 6, 2019, the entire contents of which are incorporated herein by reference for all purposes.

BACKGROUND

Electronic mail, or "email," systems are widely deployed and have largely supplanted written correspondence for both business and personal use. Examples of widely-used commercial applications that implement such systems include Microsoft Outlook and Google Gmail.

SUMMARY

This Summary is provided to introduce a selection of concepts in a simplified form that are further described below in the Detailed Description. This Summary is not intended to identify key features or essential features, nor is it intended to limit the scope of the claims included herewith.

In some of the disclosed embodiments, a method involves parsing, by a computing system, contents of an email file to determine a first individual who sent a first email communication represented in the file and a second individual who received the first email communication, presenting, by a display screen of the computing system, a graphical user interface including a graphical representation of at least the first email communication, the graphical representation including a first icon representing the first individual, a second icon representing the second individual, and a third icon representing the first email communication that was sent from the first individual to the second individual, determining, by the computing system, a selection of an icon from among at least the first icon, the second icon, and the third icon, determining that at least a first portion of the contents has a first relationship with the selected icon, and presenting, by the computing system and based at least in part on determining that the first portion has the first relationship with the selected icon, an indication on the display screen corresponding to the first portion.

In other disclosed embodiments, a system comprises at least one processor, and at least one computer-readable medium encoded with instructions which, when executed by the at least one processor, cause the system to parse contents of an email file to determine a first individual who sent a first email communication represented in the file and a second individual who received the first email communication, to present, by a display screen, a graphical user interface including a graphical representation of at least the first email communication, the graphical representation including a first icon representing the first individual, a second icon representing the second individual, and a third icon representing the first email communication that was sent from the first individual to the second individual, to determine a selection of an icon from among at least the first icon, the second icon, and the third icon, to determine that at least a first portion of the contents has a first relationship with the selected icon, and to present, based at least in part on determining that the first portion has the first relationship with the selected icon, an indication on the display screen corresponding to the first portion.

In still other disclosed embodiments, at least one computer-readable medium is encoded with instructions which, when executed by at least one processor of a computing system, cause the computing system to parse contents of an email file to determine a first individual who sent a first email communication represented in the file and a second individual who received the first email communication, to present, by a display screen, a graphical user interface including a graphical representation of at least the first email communication, the graphical representation including a first icon representing the first individual, a second icon representing the second individual, and a third icon representing the first email communication that was sent from the first individual to the second individual, to determine a selection of an icon from among at least the first icon, the second icon, and the third icon, to determine that at least a first portion of the contents has a first relationship with the selected icon, and to present, based at least in part on determining that the first portion has the first relationship with the selected icon, an indication on the display screen corresponding to the first portion.

BRIEF DESCRIPTION OF THE DRAWINGS

Objects, aspects, features, and advantages of embodiments disclosed herein will become more fully apparent from the following detailed description, the appended claims, and the accompanying figures in which like reference numerals identify similar or identical elements. Reference numerals that are introduced in the specification in association with a figure may be repeated in one or more subsequent figures without additional description in the specification in order to provide context for other features, and not every element may be labeled in every figure. The drawings are not necessarily to scale, emphasis instead being placed upon illustrating embodiments, principles and concepts. The drawings are not intended to limit the scope of the claims included herewith.

FIG. 2C is a block diagram of components that may be used to implement the computing system shown in FIG. 1B and/or one or more of the elements of the computing environment shown in FIGS. 2A and 2B;

DETAILED DESCRIPTION

Figure 1A:
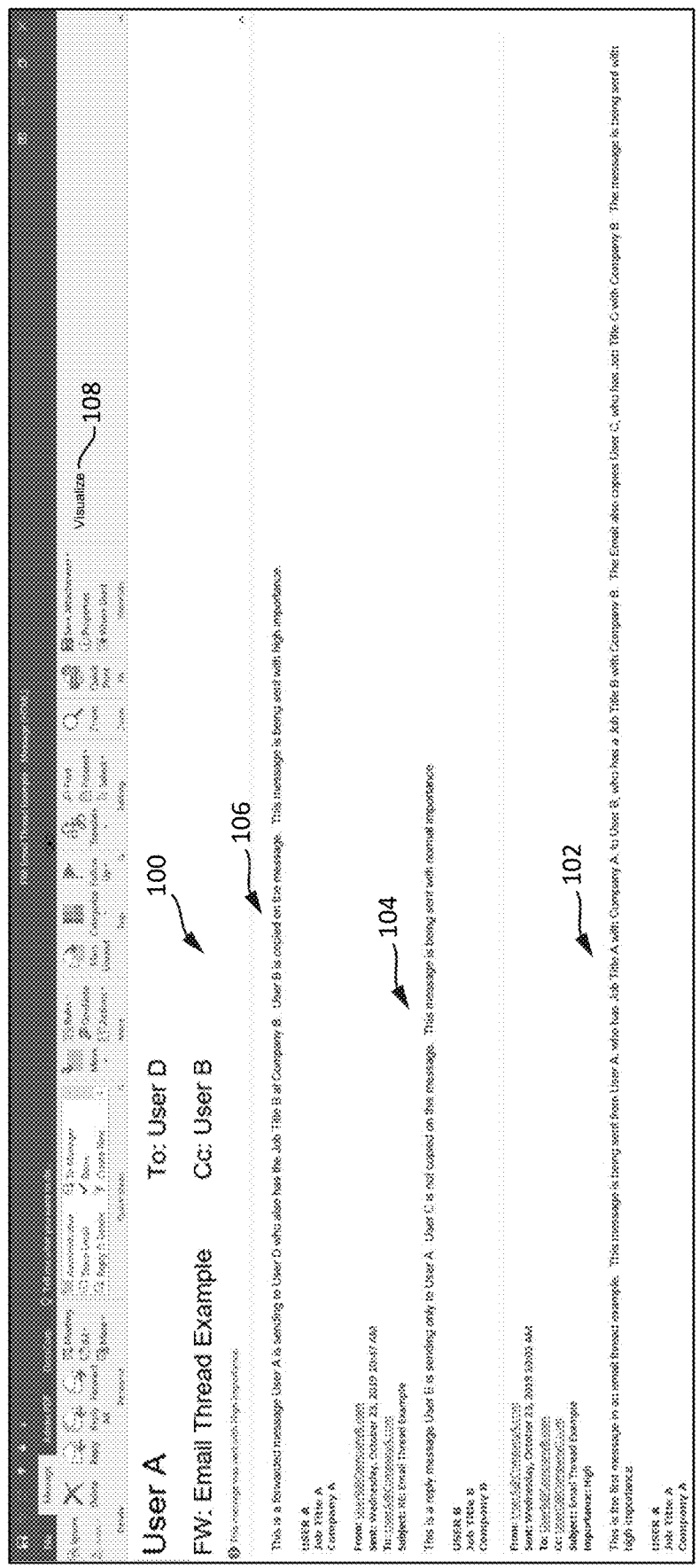
FIG. 1A shows an example email thread, including electronic communications exchanged amongst various participants, that may be represented by an email file.

For purposes of reading the description of the various embodiments below, the following descriptions of the sections of the specification and their respective contents may be helpful:

Section A provides an introduction to example embodiments of systems and methods for generating and using interactive GUIs to visualize and access contents of email files in accordance with the present disclosure;

Section B describes a network environment and computing environment which may be useful for practicing embodiments described herein;

Section C provides a detailed description of example embodiments of systems and methods for generating and using interactive GUIs to visualize and access contents of email files in accordance with the present disclosure; and Section D describes example implementations of methods, systems, and computer-readable media in accordance with the present disclosure.

A. Introduction to Illustrative Embodiments of Generating and Using Interactive GUIs for Email Files Email has many benefits over prior communication methods. Indeed, access to at least one email application and at least a minimal proficiency with its use has become indispensable in many aspects of modern day life. In spite of its many benefits, however, managing an email in-box has, for a large number of individuals, become the single most time-consuming responsibility in their professional lives.

Each time a new email file is received, and particularly for those representing lengthy email threads, a user must undertake a multi-step, time-consuming process to gain even a basic understanding of the context of the email, such as ascertaining the identity of the various senders and recipients of respective email communications, let alone accessing and understanding the substance of the various messages represented in the file. As used herein, an "email thread" refers to a sequence of email communications exchanged between or among multiple participants, with each email in the sequence including and adding to the other email communications already in the sequence. In existing systems, this process commonly involves scrolling to the very beginning of an email thread, making note of the sender and recipient of the first communication, reading the associated message, scrolling up to the next most recent message, and so on, until all messages represented in the thread have been reviewed. Often, this process needs to be performed multiple times before the user is able to gain a full appreciation of both the context and the content of the email file being reviewed. This problem can be exacerbated, moreover, if the user is not familiar with the roles, e.g., job titles, companies of employments, etc., of some or all of the participants in the email thread.

Offered is a technique by which a user may readily gain an understanding of the context of an email thread and easily identify and/or access the various portions of an email file's content that are of the most interest to the user. In particular, a graphical user interface (GUI) may be provided that, through a graphical representation of interrelated icons, may visually illustrate each of the individuals involved in the correspondence, as well as the flow of messages amongst such individuals. Such a GUI may not only assist a user in understanding the context of the email thread in question, e.g., by identifying who has sent what types of messages to whom, but may also allow the user, by interacting with the various displayed icons, to quickly and seamlessly identify and/or access particular portions of the email file's content that are of particular interest to the user.

FIG. 1A shows an example of a relatively simple email thread 100 that may be presented on a display screen of a computing device operated by an individual named "User B" when User B opens an email file located in a folder of User B's email system. As indicated, User B received the email file from another individual named "User A" as a carbon copy ("Cc:") recipient. As shown, the email thread 100 includes: (1) a first email communication 102 that was sent to User B, who has Job Title B at Company B, by User A, who has Job Title A at Company A, and was also sent to User C, who has Job Title C at Company C, as a carbon copy recipient, (2) a second email communication 104 that was sent from User B to only User A as a reply ("RE:") to the first email communication 102, and (3) a third message 106, which is a forwarded ("FW:") version of the second email communication 104, that was sent to from User A to User D, who also has Job Title B at Company B, and was also sent to User B as a carbon copy recipient. As is readily apparent, even for this relatively simple example, it can be quite cumbersome and time-consuming to ascertain both the context and the content of the various messages contained in the thread.

Figure 1B:
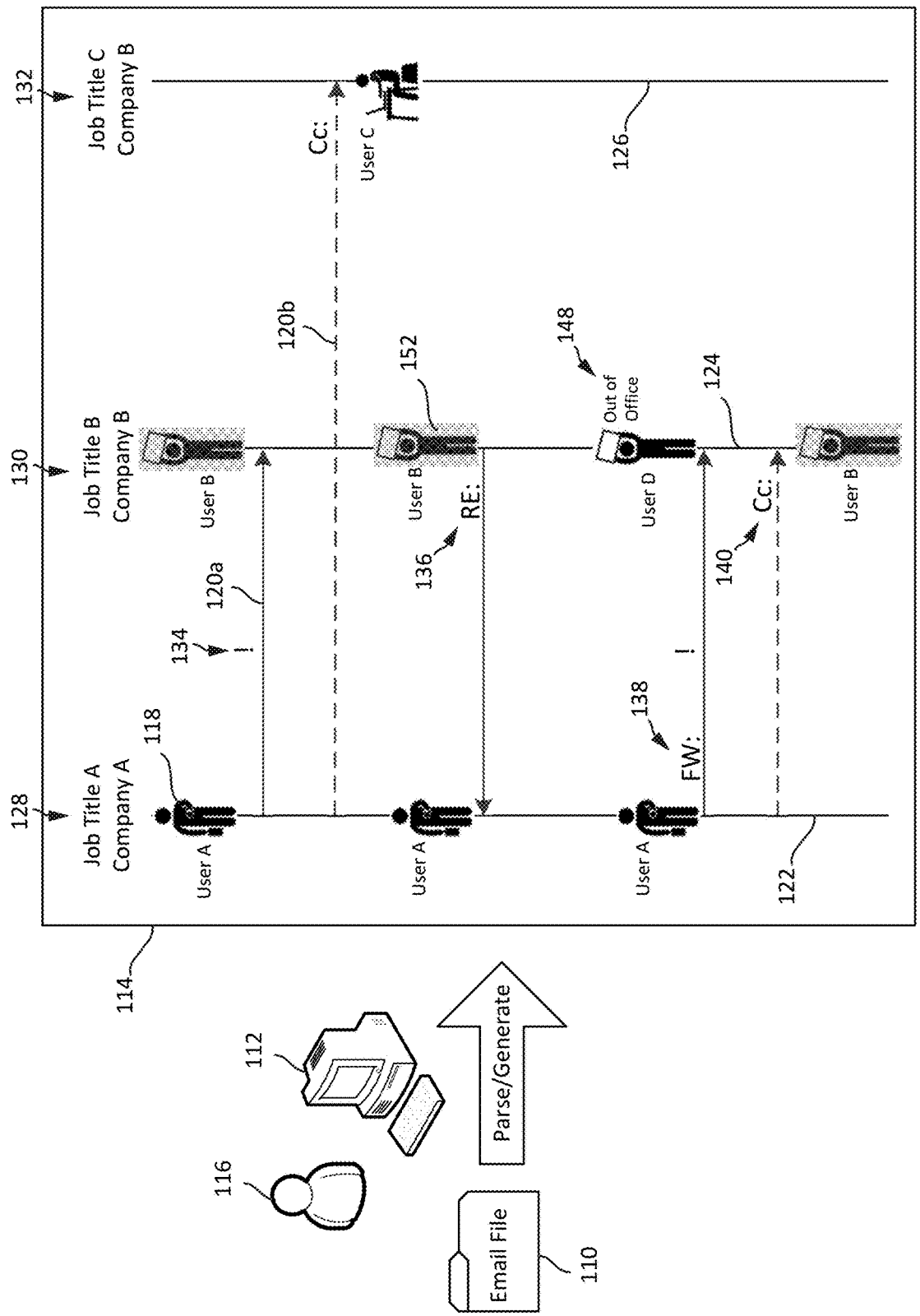
FIG. 1B shows an example of a graphical representation for a graphical user interface (GUI) that may be generated for the email file corresponding to the email thread shown in FIG. 1A.

As shown in FIG. 1B, to facilitate visualization and access to the various portions of an email file 110, a computing system 112 may parse the contents of the file 110 to generate a graphical user interface (GUI) 114 with which a user 116 may interact to quickly and seamlessly identify and/or access particular portions of the file's content that are of particular interest to the user 116. Although FIG. 1B illustrates a personal computer as the computing system 112, it should be appreciated that the computing system 112 may instead correspond to a laptop, a smartphone, a cloud-based system implementing Software as a Service (SaaS) application, a virtual computing environment, or any other type of computing system capable of parsing an email file and generating a GUI as disclosed herein. In some embodiments, the parsing/GUI generation process may be initiated from the email application itself, such as by selecting a "visualize" option in an action ribbon, tool bar, or the like in the email application window. For example, referring back to FIG. 1A, in some embodiments, an Office Add-in may be provided for a Microsoft Outlook application that causes a "visualize" button 108 to be provided in an action ribbon of a window associated with the email file 110. In some embodiments, like that shown in FIG. 1A, the "visualize" option may be selectable after the file has been opened. In some implementations, such an option may additionally or alternatively be selected before the file is opened, e.g., by highlighting or otherwise selecting a file designator in the user's in-box or other folder maintained by the email system and then selecting a "visualize" option, such as by right-clicking on a file (e.g., on a file designator) and selecting a "visualize" option from a drop-down menu, or otherwise.

As shown in FIG. 1B, the GUI 114 may include participant icons 118 representing the various individuals who participated in, i.e., sent and/or received one or more email communications included in, the email thread represented in the file 110, as well as message icons 120*a*, 120*b* representing the respective email communications that were exchanged amongst those individuals. As illustrated, in some embodiments, the participant icons 118 in the graphical representation that correspond to the user who is currently operating the GUI 114 (user B in the example shown) may optionally be highlighted or otherwise indicated (e.g., see highlighting 152). Highlighting or otherwise indicating those icons may, for example, facilitate that user's ability to quickly understand his or her role within the email thread as a whole.

As also shown, in some embodiments, the participant icons 118 for individuals may be separated into groups based on the job titles and/or companies where the individuals are employed, or on any other suitable characteristic, to make the graphical representation easier to interpret. In the example shown, the participant icons 118 are separated into three such groups along respective vertical lines 122, 124, 126, with a first group 128 corresponding to individuals who have Job Title A at Company A, a second group 130 corresponding to individuals who have Job Title B at Company B, and a third group 132 corresponding to individuals who have Job Title C at Company B.

As shown, in some embodiments, names of individuals, e.g., "User A," may be displayed adjacent the participant icons 118 to further facilitate interpretation and use of the GUI 114. In the illustrated example, based on the names displayed adjacent the participant icons 118, it can readily be determined that there is one individual, i.e., User A, in the first group 128, that there are two individuals, i.e., User B and User D in the second group 130, and that there is one individual, i.e., User C, in the third group 132. In the example shown, different types of participant icons 118 are displayed for different groups. In some implementations, however, icons for different groups may be distinguished in additional or different ways, such as by having different colors, sizes, textures, etc. Further, in some embodiments, participant icons 118 representing different individuals in the same group may additionally or alternatively be distinguishable in some fashion, such as by icon type, color, size, texture, etc. As explained in more detail below, in some embodiments, the names, job titles, and/or companies of employment of the depicted participants may be ascertained, for example, by referencing a "contacts" list or other database containing such information, may be derived from information in signature lines of the various email communications, and/or may be derived using portions of the email addresses associated with the participants.

As illustrated in FIG. 1B, in some embodiments, status labels 148 or other indicators, e.g., different colors, overlay icons, etc., may be provided on the GUI 114 to indicate the current status of certain individuals represented by the participant icons 118. In the illustrated example, for instance, a status label 148 is positioned adjacent the icon 118 associated with User D to indicate that User D is currently out of the office. Information concerning the current status of the participants may be obtained, for example, from the email application or from an external data source that tracks the current status of individuals, e.g., on-line, off-line, unavailable, etc.

As further illustrated in FIG. 1B, in some embodiments, importance labels 134, e.g., "!", or other indicators, may be associated with certain message icons 120 to indicate the "importance" designation associated with those messages, reply message labels 136, e.g., "RE:", or other indicators, may be associated with certain message icons 120 to indicate those messages correspond to replies to other email communications, forwarded message labels 138, e.g., "FW:", or other indicators, may be associated with certain message icons 120 to indicate those messages correspond to forwarded versions of other email communications, and/or carbon copy labels 140, e.g., "Cc:", or other indicators, may be associated with certain message icons 120 to indicate that those messages were sent as copies of messages that were directly addressed to other participants. As additionally illustrated, in some embodiments, the message icons 120*b* corresponding to carbon copied messages may be different than the message icons 120*a* corresponding to messages that were sent to the primary addressees of such messages. Although, in the example shown, such a difference is indicated by a dashed as opposed to a solid line, it may additionally or alternatively be indicated in other ways, such as by different colors, highlighting, etc.

Figure 1C:
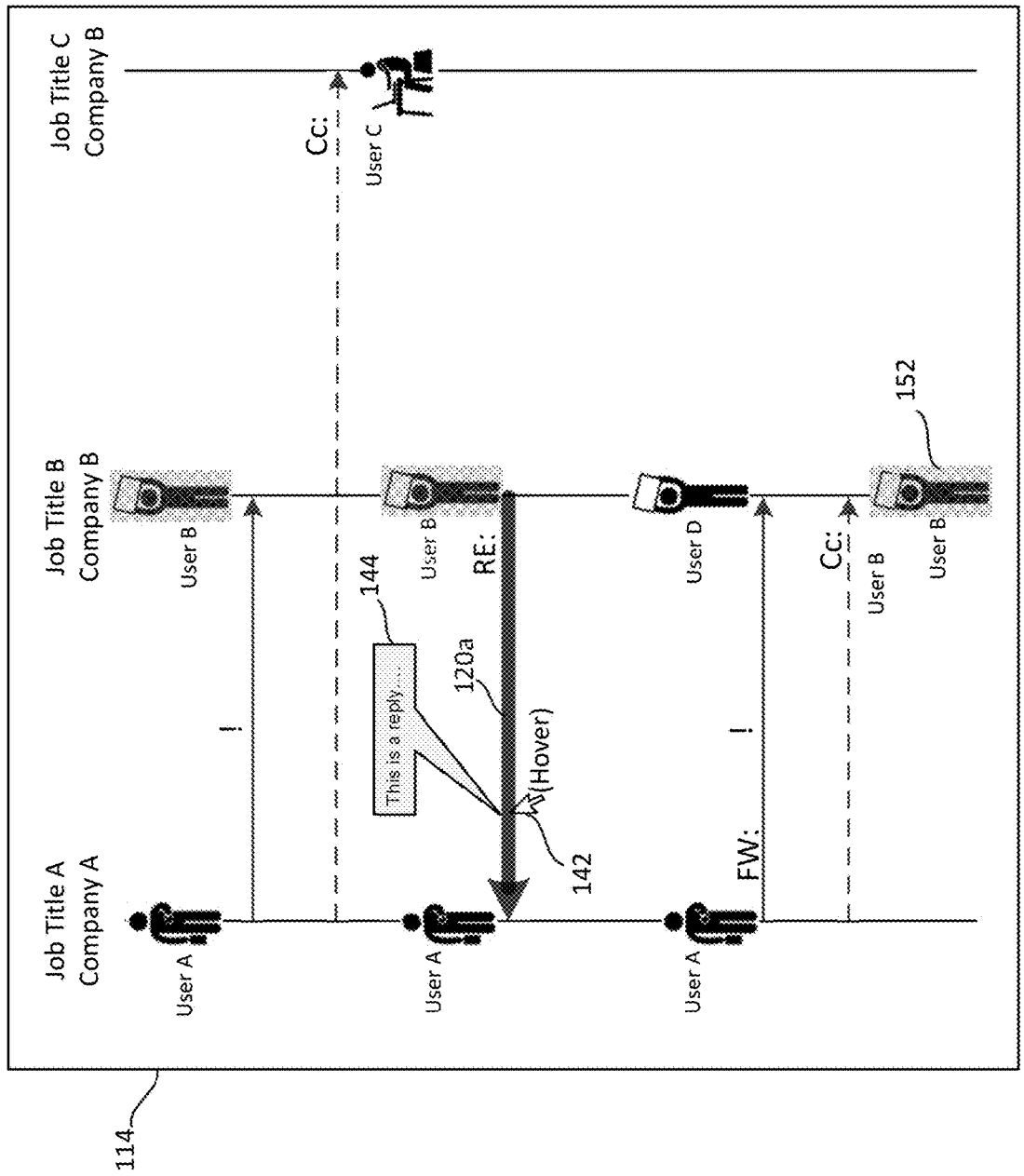
FIG. 1C illustrates a first function that may be performed by the GUI shown in FIG. 1B in response to a participant using a first action (e.g., hovering a mouse cursor) to select a message icon included in the graphical representation.
Figure 1D:
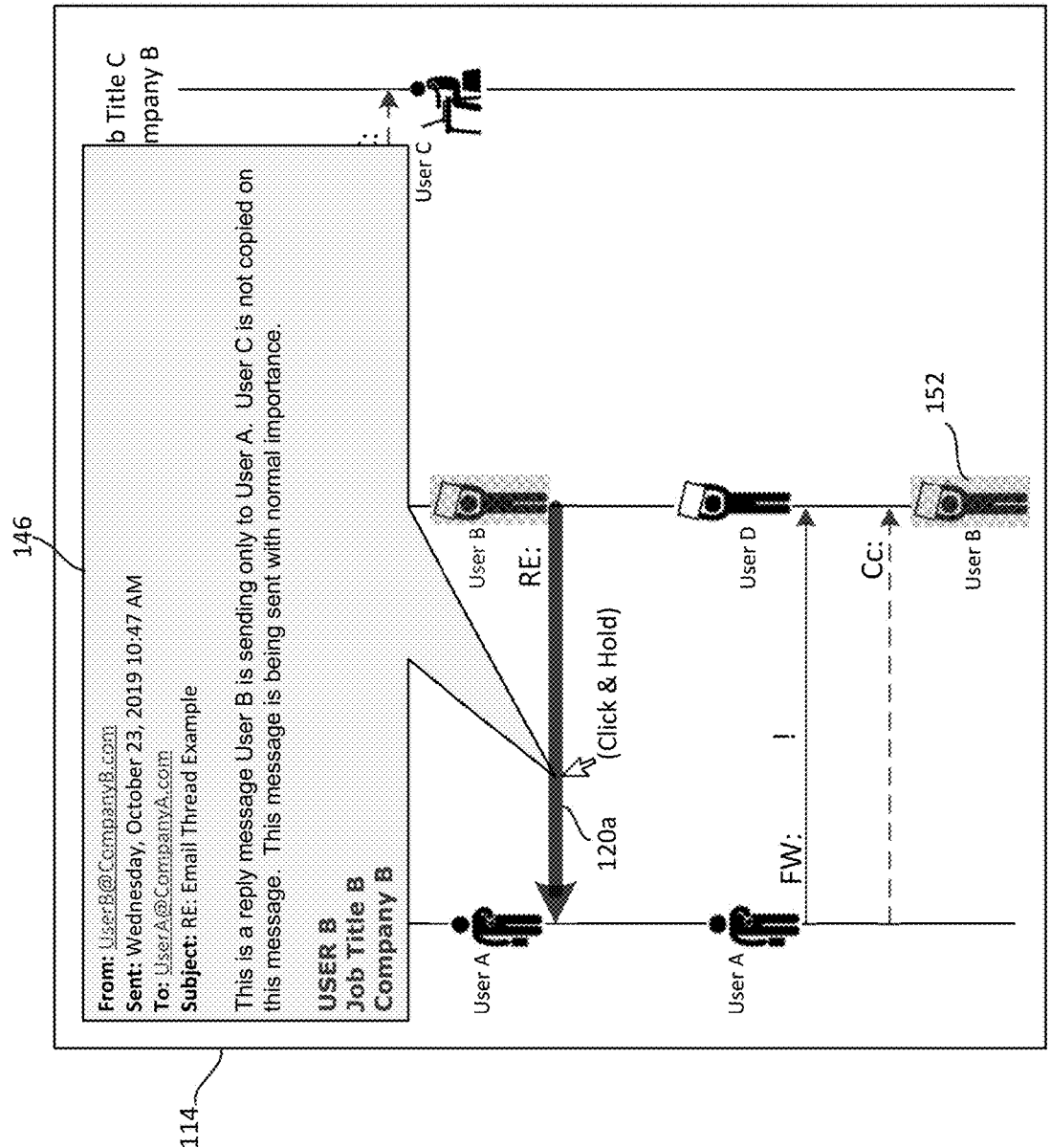
FIG. 1D illustrates a second function that may be performed by the GUI shown in FIG. 1B in response to a participant using a second action (e.g., clicking and holding a mouse button) to select a message icon included in the graphical representation.
Figure 1E:
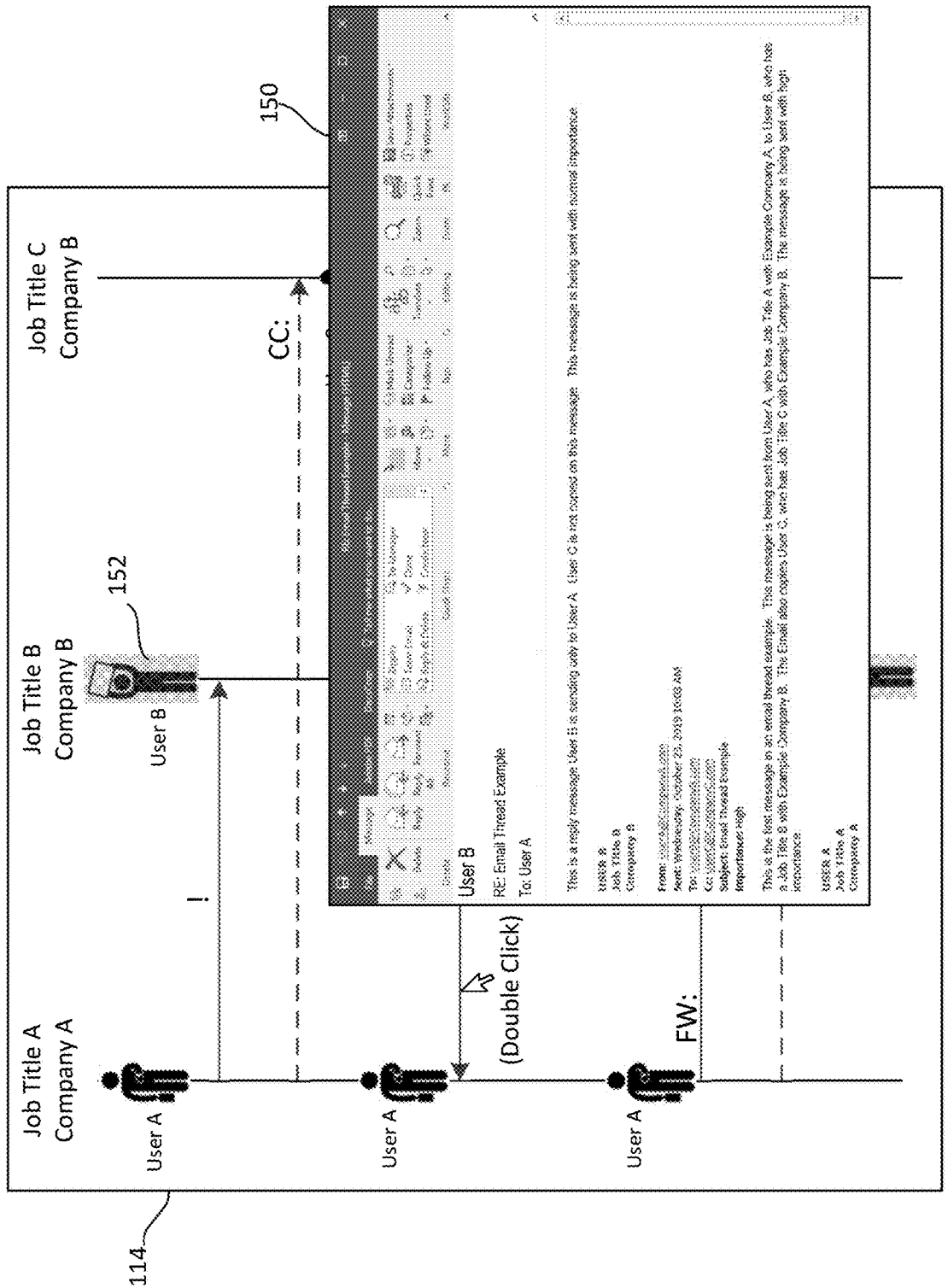
FIG. 1E illustrates a third function that may be performed by the GUI shown in FIG. 1B in response to a participant using a third action (e.g., double clicking a mouse button) to select a message icon included in the graphical representation.

FIGS. 1C-1E illustrate examples of possible ways that a user may interact with the GUI 114 shown in FIG. 1B to quickly and seamlessly identify and/or access particular portions of the content of the email file 110 that are of particular interest to the user. As shown in FIG. 1C, by using a first action to select one of the message icons 120, e.g., by hovering a mouse cursor over a message icon 120, or by single-tapping a message icon 120 on a touch-screen, etc., an abstract of the email communication corresponding to the selected message icon 120 may be presented, e.g., in a message bubble 144. In some embodiments, such an abstract may, for example, include the first several words of the body of the email communication. In some implementations, if the body of the email communication included an image, such an image may additionally or alternatively be included in the abstract for that email communication. As illustrated, in some embodiments, the selected message icon 120 may additionally be emphasized in some fashion, e.g., by enlarging, bolding, coloring, etc., to indicate that the message icon 120 is currently selected. The user 116 (shown in FIG. 1B) may thus move a cursor, finger, stylus, etc., about the GUI 114, selecting various message icons 120 and viewing abstracts of the corresponding messages.

As shown in FIG. 1D, if the user 116 identifies, based on viewed abstracts or otherwise, a message the user wants to view in more detail, the user may use a second action to select a message icon 120 corresponding to that message, e.g., by clicking and holding a mouse button while the cursor is pointing to a message icon 120, or by continuously touching the message icon 120 on a touch-screen, etc. As FIG. 1D illustrates, in response to selecting an icon using such a second action, a larger portion, and perhaps, as illustrated, even the entirety of the message corresponding to the selected message icon 120, may be presented, e.g., in a larger message bubble 146. As with the example of FIG. 1C, the selected message icon 120 may additionally be emphasized in some fashion, e.g., by enlarging, bolding, coloring, etc., to indicate that the message icon 120 is currently selected. The user 116 may thus move a cursor, finger, stylus, etc., about the GUI 114, selecting various icons 120 and first viewing abstracts of the corresponding messages using the first action (e.g., hover), and, if desired, temporarily viewing the entirety of individual messages using the second action (e.g., click and hold).

FIG. 1E shows yet another example operation that may be performed with the GUI 114 by using a third action to select a message icon 120, e.g., by double-clicking a mouse button while the mouse cursor is pointing to a message icon 120, or by double-tapping on a message icon 120 on a touch-screen, etc. As shown, in response to detecting selection of a message icon 120 using such a third action, the computing system 112 may attempt to identify an email file corresponding to the selected message icon 120 and, if such an email is accessible, open such a file in a new window 150. The user may then take any actions the user would ordinarily take with an open email file, such as forwarding it to another individual, replying to the individual who sent the email message, printing a hard copy of the email thread, etc. In some embodiments, for example, the computing system 112 may use one or more application programming interface (API) functions of the email application to search for, retrieve, and open the pertinent email file from the user's email folders. In some implementations, as described in more detail below, other actions selecting a message icon 120 may additionally or alternatively directly cause a particular action to be taken with respect to the email file corresponding to the selected message icon 120. For example, in some embodiments, the user may right-click on the message icon 120 to identify a drop-down menu listing available actions, e.g., open, forward, reply, print, etc., and may select one of indicated actions to be performed.

Several additional examples of functionality that may be achieved using different actions to select the message icons 120, as well as examples of functionality that may be achieved by using various actions to select the participant icons 118, are described below in Section C, following a description of example systems and network environments in which such embodiments may be deployed.

B. Network and Computing Environment

Figure 2A:
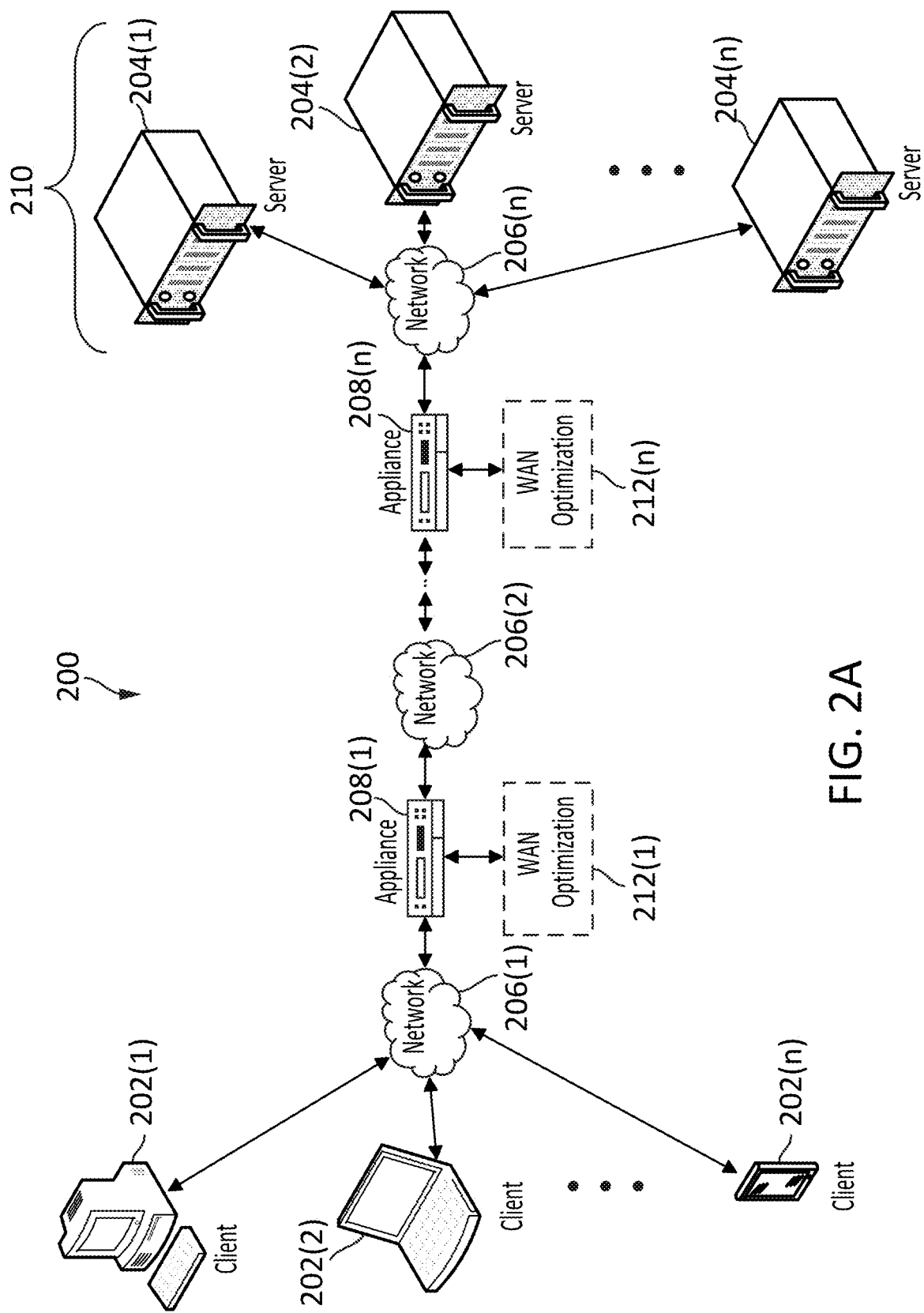
FIG. 2A is a diagram of a network computing environment in which some embodiments of systems and techniques for accessing and visualizing the contents of email files disclosed herein may deployed.

Referring to FIG. 2A, an illustrative network environment 200 is depicted. As shown, the network environment 200 may include one or more clients 202(1)-202(n) (also generally referred to as local machine(s) 202 or client(s) 202) in communication with one or more servers 204(1)-204(n) (also generally referred to as remote machine(s) 204 or server(s) 204) via one or more networks 206(1)-206(n) (generally referred to as network(s) 206). In some embodiments, a client 202 may communicate with a server 204 via one or more appliances 208(1)-208(n) (generally referred to as appliance(s) 208 or gateway(s) 208).

Although the embodiment shown in FIG. 2A shows one or more networks 206 between the clients 202 and the servers 204, in some implementations, the clients 202 and the servers 204 may be on the same network 206. When multiple networks 206 are employed, the various networks 206 may be the same type of network or different types of networks. For example, in some embodiments, the networks 206(1) and 206(n) may each be a private network such as a local area network (LAN) or a company Intranet, while the network 206(2) may be a public network, such as a wide area network (WAN) or the Internet. In some embodiments, one or both of the network 206(1) and the network 206(n), as well as the network 206(2), may be public networks. Alternatively, in some embodiments, all three of the network 206(1), the network 206(2) and the network 206(n) may be private networks. The networks 206 may employ one or more types of physical networks and/or network topologies, such as wired and/or wireless networks, and may employ one or more communication transport protocols, such as transmission control protocol (TCP), internet protocol (IP), user datagram protocol (UDP) or other similar protocols.

As shown in FIG. 2A, one or more appliances 208 may be located at various points or in various communication paths of the network environment 200. For example, the appliance 208(1) may be deployed between the network 206(1) and the network 206(2), and the appliance 208(n) may be deployed between the network 206(2) and the network 206(n). In some embodiments, the appliances 208 may communicate with one another and work in conjunction to, for example, accelerate network traffic between the clients 202 and the servers 204. In some embodiments, each appliance 208 may act as a gateway between two or more networks. In some embodiments, one or more of the appliances 208 may additionally or alternatively be implemented in conjunction with or as part of a single one of the clients 202 or servers 204 to allow such device to connect directly to one of the networks 206. In some embodiments, one or more of the appliances 208 may be implemented as network devices sold by Citrix Systems, Inc., of Fort Lauderdale, Fla., such as Citrix Gateway™ or Citrix ADC™.

As shown in FIG. 2A, in some embodiments, groups of the servers 204 may operate as one or more server farms 210. The servers 204 of each such server farm 210 may be logically grouped, and may either be geographically co-located (e.g., on premises) or geographically dispersed (e.g., cloud based) from the clients 202 and/or other servers 204. In some embodiments, as explained in more detail below, one or more server farms 210 may execute one or more applications on behalf of one or more of clients 202 (e.g., as an application server system) and/or may facilitate the sharing of files between the clients 202 (e.g., as a file sharing system), although other uses are possible, such as a file server, gateway server, proxy server, or other similar server uses. In some embodiments, two or more server farms 210 may communicate with one another, e.g., via respective appliances 208 connected to the network 206(2), to allow multiple server-based processes to interact with one another.

As also shown in FIG. 2A, in some embodiments, one or more of the appliances 208 may include, be replaced by, or be in communication with, one or more additional appliances, such as WAN optimization appliances 212(1)-212(n), referred to generally as WAN optimization appliance(s) 212. For example, each WAN optimization appliance 212 may accelerate, cache, compress or otherwise optimize or improve performance, operation, flow control, or quality of service of network traffic, such as traffic to and/or from a WAN connection, such as optimizing Wide Area File Services (WAFS), accelerating Server Message Block (SMB) or Common Internet File System (CIFS). In some embodiments, one or more of the appliances 212 may be a performance enhancing proxy or a WAN optimization controller. In some embodiments, for example, one or more of the appliances 212 may be implemented as products sold by Citrix Systems, Inc., of Fort Lauderdale, Fla., such as Citrix SD-WAN™ or Citrix Cloud™.

Figure 2B:
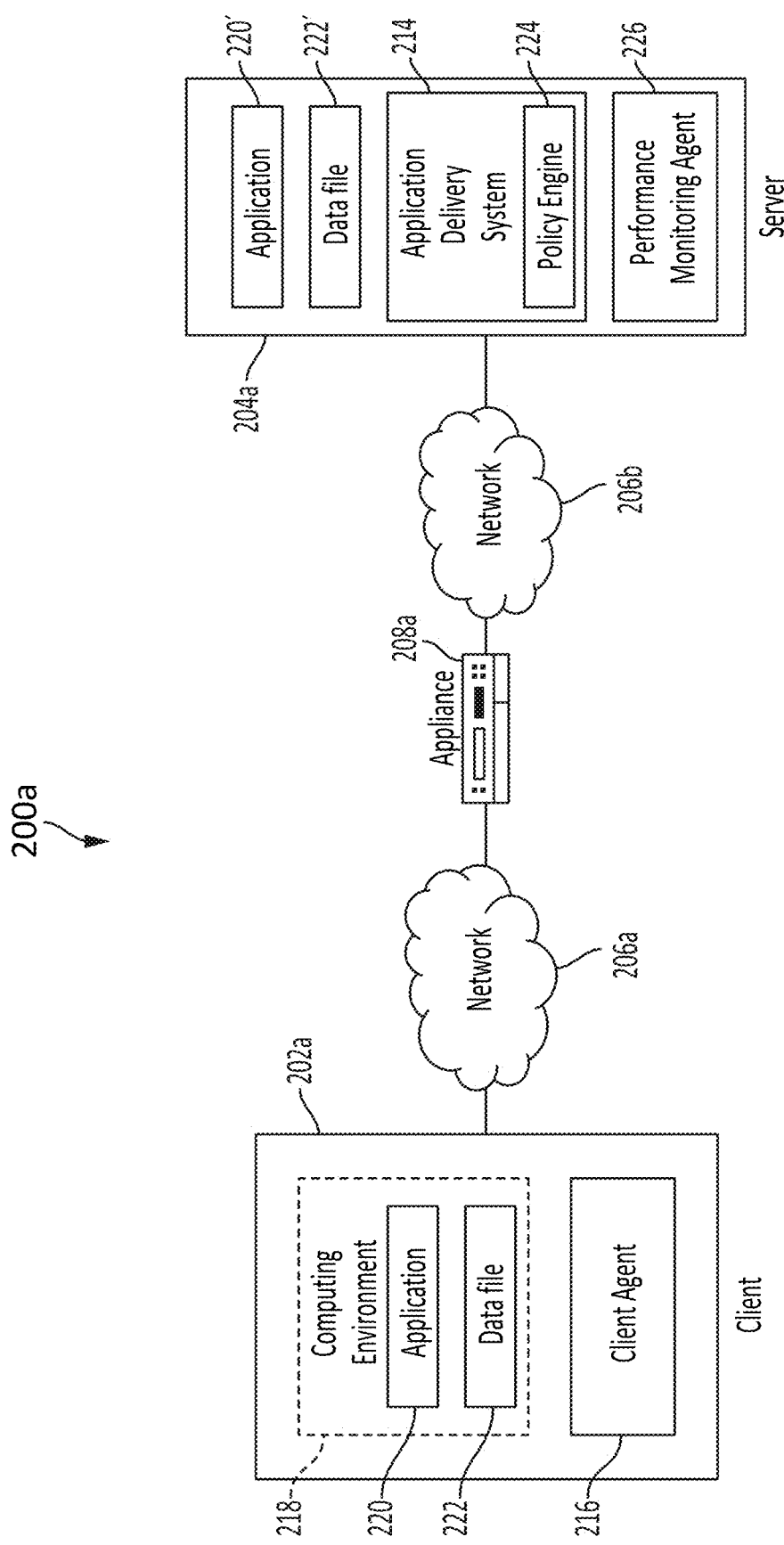
FIG. 2B is a diagram illustrating how a network computing environment like that shown in FIG. 2A may be configured to deliver an email application, as well as the functionality disclosed herein for accessing and visualizing the contents of email files, to a client.

Referring to FIG. 2B, an example network environment 200a for delivering and/or operating a computing environment on a client 202a is shown. As shown in FIG. 2B, in some embodiments, a client 202a may include a computing environment 218, and a server 204a may include an application delivery system 214 for delivering a computing environment, application, and/or data files to one or more clients 202.

In some embodiments, each client 202 may additionally include a client agent 216 for establishing and exchanging communications with the appliance 208 and/or the server(s) 204 via a network 206. The client 202*a* may, for example, have installed and/or execute one or more applications that are in communication with the network 206*a*. In some embodiments, the client agent 216 may intercept network communications from a network stack used by the one or more applications. For example, the client agent 216 may intercept a network communication at any point in a network stack and redirect the network communication to a destination desired, managed, and/or controlled by the client agent 216, for example, to intercept and redirect a transport layer connection to an IP address and port controlled and/or managed by the client agent 216. The client agent 216 may thus, in some embodiments, transparently intercept any protocol layer below the transport layer, such as the network layer, and any protocol layer above the transport layer, such as the session, presentation, or application layers. The client agent 216 may, for example, interface with the transport layer to secure, optimize, accelerate, route, and/or load-balance any communications provided via any protocol carried by the transport layer.

In some embodiments, the client agent 216 may be implemented as an Independent Computing Architecture (ICA) client developed by Citrix Systems, Inc. The client agent 216 may perform acceleration, streaming, monitoring, and/or other operations. For example, the client agent 216 may accelerate streaming an application from the server 204*a* to the client 202*a*. The client agent 216 may also perform end-point detection/scanning and/or collect end-point information about the client 202*a* for the appliance 208*a* and/or the server 204*a*. The appliance 208*a* and/or the server 204*a* may use the collected information to determine and provide access, authentication, and/or authorization control of the client's connection to the network 206*a*. For example, the client agent 216 may identify and determine one or more client-side attributes, such as: the operating system and/or a version of an operating system, a service pack of the operating system, a running service, a running process, a file, presence or versions of various applications of the client, such as antivirus, firewall, security, and/or other software.

The computing environment 218 may, for example, execute or operate an application 220 that accesses, processes and/or uses a data file 222. The computing environment 218, application 220 and/or data file 222 may be delivered via an appliance 208*a* and/or the server 204*a*.

The appliance 208*a* may accelerate delivery of all or a portion of the computing environment 218 to the client 202*a*, for example by the application delivery system 214. For example, the appliance 208*a* may accelerate delivery of a streaming application 220' and data file 222' processable by the application 220 from a data center to a remote user location by accelerating transport layer traffic between the client 202*a* and the server 204*a*. Such acceleration may be provided by one or more techniques, such as: 1) transport layer connection pooling, 2) transport layer connection multiplexing, 3) transport control protocol buffering, 4) compression, 5) caching, or other techniques. The appliance 208*a* may also provide load balancing of servers 204 in a server farm 210 (shown in FIG. 2A) to process requests from the clients 202, act as a proxy or access server to provide access to the one or more servers 204, provide security and/or act as a firewall between the clients 202 and the servers 204, provide Domain Name Service (DNS) resolution, provide one or more virtual servers or virtual internet protocol servers, and/or provide secure virtual private network (VPN) connections from the clients 202 to the servers 204, such as a secure socket layer (SSL) VPN connection and/or provide encryption and decryption operations.

The application delivery system 214 may deliver the computing environment 218 to a user (e.g., client 202*a*), remote or otherwise, based on authentication and authorization policies applied by a policy engine 224. A remote user may obtain a computing environment and access to server stored applications 220' and data files 222' from any network-connected device (e.g., the client 202*a*). For example, the appliance 208*a* may request an application 220' and data file 222' from the server 204*a*. In response to the request, the application delivery system 214 and/or the server 204*a* may deliver the application 220' and data file 222' to the client 202*a*, for example via an application stream to operate in the computing environment 218 on client the 202*a*, or via a remote-display protocol or otherwise via remote-based or server-based computing. In an embodiment, application delivery system 214 may be implemented as any portion of the Citrix Workspace™ by Citrix Systems, Inc., of Fort Lauderdale, Fla., such as Citrix Virtual Apps and Desktops™.

The policy engine 224 may control and manage the access to, and execution and delivery of, applications. For example, the policy engine 224 may determine the one or more applications a user or client 202 may access and/or how the application should be delivered to the user or client 202, such as a server-based computing, streaming or delivering the application locally to the client 202 for local execution.

For example, in operation, the client 202*a* may request execution of an application (e.g., application 220') and the application delivery system 214 of the server 204*a* may determine how to execute the application 220', for example based upon credentials received from the client 202*a* and a user policy applied by the policy engine 224 associated with the credentials. For example, the application delivery system 214 may enable the client 202*a* to receive application-output data generated by execution of the application on the server 204*a*, may enable client the 202*a* to execute the application 220 locally after receiving the application from the server 204*a*, or may stream the application via one or more networks 206*a*, 206*b* to the client 202*a*. For example, in some embodiments, the application 220 may be a server-based or a remote-based application executed on the server 204*a* on behalf of the client 202*a*. The server 204*a* may display output to the client 202*a* using a thin-client or remote-display protocol, such as the Independent Computing Architecture (ICA) protocol by Citrix Systems, Inc. The application 220 may be any application related to real-time data communications, such as applications for streaming graphics, streaming video and/or audio or other data, delivery of remote desktops or workspaces or hosted services or applications, for example infrastructure as a service (IaaS), workspace as a service (WaaS), software as a service (SaaS) or platform as a service (PaaS).

As shown, one or more servers 204 may also include a performance monitoring service or agent 226. In some embodiments, a dedicated one or more servers 204 may be employed to perform performance monitoring. Performance monitoring may be performed using data collection, aggregation, analysis, management and reporting, for example by software, hardware or a combination thereof. Performance monitoring may include one or more agents for performing monitoring, measurement and data collection activities on one or more clients 202 (e.g., the client agent 216), one or more servers 204 (e.g., the agent 226) and/or one or more appliances 208 and/or 212 (agent not shown). In general, the monitoring agents (e.g., agent 216 and/or agent 226) may execute transparently (e.g., in the background) to any application and/or user of the device. In some embodiments, the monitoring agent 226 may be implemented as Citrix Analytics™ by Citrix Systems, Inc., of Fort Lauderdale, Fla.

The monitoring agents may, for example, monitor, measure, collect, and/or analyze data on a predetermined frequency, based upon an occurrence of given event(s), or in real time during operation of the network environment 200a. The monitoring agents may monitor resource consumption and/or performance of hardware, software, and/or communications resources of the clients 202, networks 206, appliances 208 and/or 212, and/or servers 204. For example, network connections such as a transport layer connection, network latency, bandwidth utilization, end-user response times, application usage and performance, session connections to an application, cache usage, memory usage, processor usage, storage usage, database transactions, client and/or server utilization, active users, duration of user activity, application crashes, errors, or hangs, the time required to log-in to an application, a server, or the application delivery system, and/or other performance conditions and metrics may be monitored.

The monitoring agents may provide application performance management for the application delivery system 214. For example, based upon one or more monitored performance conditions or metrics, the application delivery system 214 may be dynamically adjusted, for example periodically or in real-time, to optimize application delivery by the servers 204 to the clients 202 based upon network environment performance and conditions.

In the described embodiments, the clients 202, servers 204, and appliances 208 and/or 212 (appliances 212 are shown in FIG. 2A) may be deployed as and/or executed on any type and form of computing device, such as any desktop computer, laptop computer, rack-mounted computer, or mobile device capable of communication over at least one network and performing the operations described herein. For example, the clients 202, servers 204 and/or appliances 208 and/or 212 may each correspond to one computer, a plurality of computers, or a network of distributed computers such as computer 246 shown in FIG. 2C.

As shown in FIG. 2C, the computer 246 may include one or more processors 248, volatile memory 250 (e.g., RAM), non-volatile memory 252 (e.g., one or more hard disk drives (HDDs) or other magnetic or optical storage media, one or more solid state drives (SSDs) such as a flash drive or other solid state storage media, one or more hybrid magnetic and solid state drives, and/or one or more virtual storage volumes, such as a cloud storage, or a combination of such physical storage volumes and virtual storage volumes or arrays thereof), a user interface (UI) 254, one or more communications interfaces 256, and a communication bus 258. The user interface 254 may include a graphical user interface (GUI) 260 (e.g., a touchscreen, a display, etc.) and one or more input/output (I/O) devices 262 (e.g., a mouse, a keyboard, etc.). The non-volatile memory 252 may store an operating system 264, one or more applications 266, and data 268 such that, for example, computer instructions of the operating system 264 and/or applications 266 are executed by the processor(s) 248 out of the volatile memory 250. Data may be entered using an input device of the GUI 260 or received from I/O device(s) 262. Various elements of the computer 246 may communicate via communication the bus 258. The computer 246 as shown in FIG. 2C is shown merely as an example, as the clients 202, servers 204 and/or appliances 208 and 212 may be implemented by any computing or processing environment and with any type of machine or set of machines that may have suitable hardware and/or software capable of operating as described herein.

The processor(s) 248 may be implemented by one or more programmable processors executing one or more computer programs to perform the functions of the system. As used herein, the term "processor" describes an electronic circuit that performs a function, an operation, or a sequence of operations. The function, operation, or sequence of operations may be hard coded into the electronic circuit or soft coded by way of instructions held in a memory device. A "processor" may perform the function, operation, or sequence of operations using digital values or using analog signals. In some embodiments, the "processor" can be embodied in one or more application specific integrated circuits (ASICs), microprocessors, digital signal processors, microcontrollers, field programmable gate arrays (FPGAs), programmable logic arrays (PLAs), multi-core processors, or general-purpose computers with associated memory. The "processor" may be analog, digital or mixed-signal. In some embodiments, the "processor" may be one or more physical processors or one or more "virtual" (e.g., remotely located or "cloud") processors.

The communications interfaces 256 may include one or more interfaces to enable the computer 246 to access a computer network such as a LAN, a WAN, or the Internet through a variety of wired and/or wireless or cellular connections.

As noted above, in some embodiments, one or more computers 246 may execute an application on behalf of a user of a client computing device (e.g., a client 202), may execute a virtual machine, which provides an execution session within which applications execute on behalf of a user or a client computing device (e.g., a client 202), such as a hosted desktop session, may execute a terminal services session to provide a hosted desktop environment, or may provide access to a computing environment including one or more of: one or more applications, one or more desktop applications, and one or more desktop sessions in which one or more applications may execute.

C. Detailed Description of Example Embodiments of Generating and Using Interactive GUIs for Email Files As noted above in connection with FIG. 1B, the computing system 112 that is used to parse and generate an email file 110 to generate a GUI 114 with which a user 116 may interact to quickly and seamlessly identify and/or access particular portions of the file's content may take on any of numerous forms. The computing system 112 may, for example, be embodied by any of the clients 202 and/or servers 204 described above. In some implementations, one or more computer-readable media may be encoded with instructions that, when executed by one or more processors of the computing system 112, cause the computing system 112 to perform various processes for generating a graphical representation for the GUI 114 as well as for enabling user interaction with the GUI 114 as described herein. As noted above, in some embodiments, such functionality may be provided as an integrated feature, e.g., an add-in or enhancement, of an existing email application, such as Outlook, Gmail, etc. Alternatively, in some implementations, the described functionality may be enabled using one or more applications that are separate from the email applications that are used to generate, send, receive, and view the email files that are processed as described herein.

Figure 3:
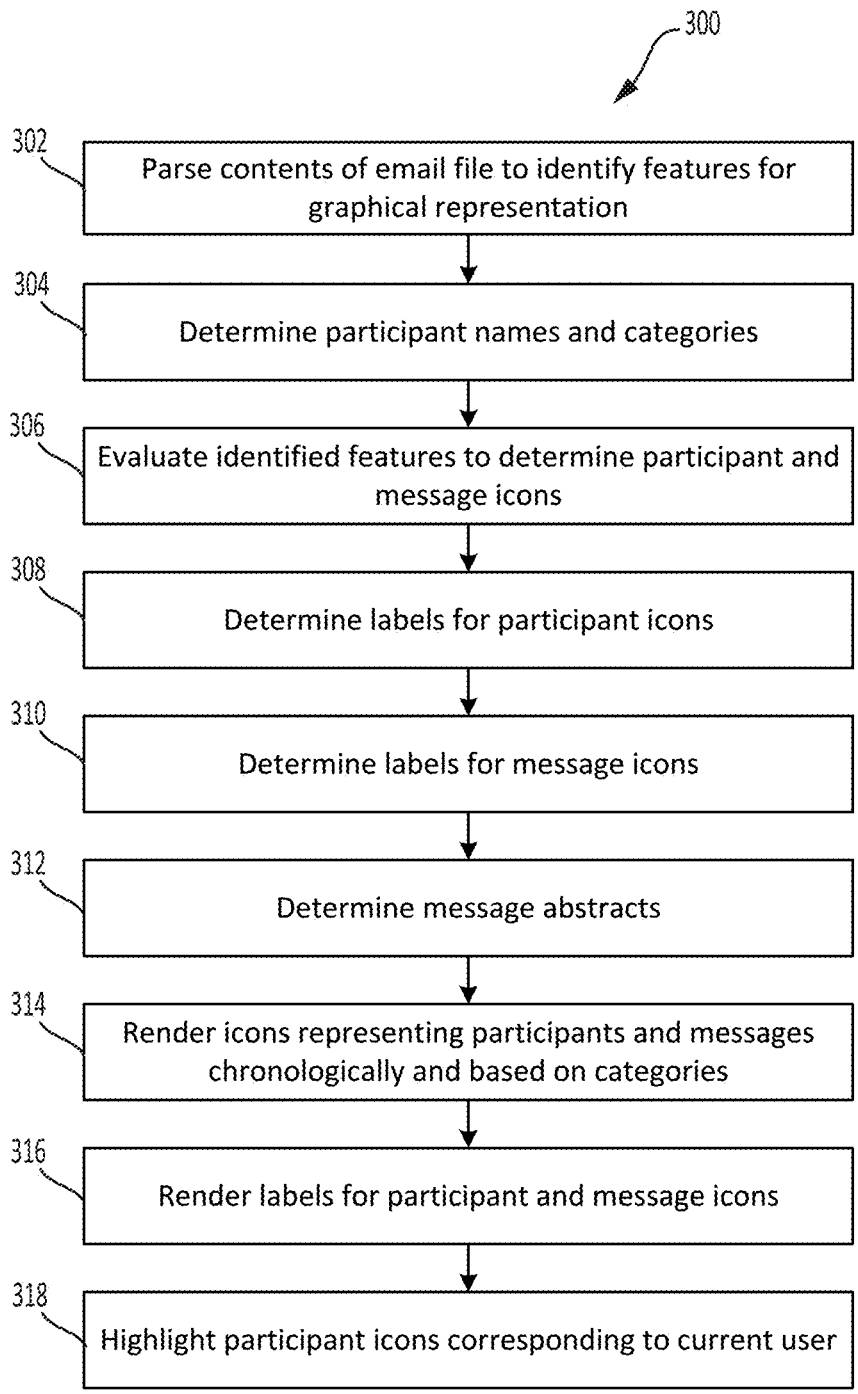
FIG. 3 shows an example routine that may be performed by a computing system to parse an email file and generate a graphical representation for a GUI such as that depicted in FIGS. 1B-E.

FIG. 3 shows an example of a routine 300 that may be performed by the computing system 112 to parse an email file 110 and generate a graphical representation for a GUI 114 (e.g., as shown in FIG. 1B) in accordance with some embodiments of the present disclosure. As alluded to above, in some embodiments, the routine 114 may be initiated in response to a user, e.g., the user 116 shown in FIG. 1B, selecting a "visualize" option for an identified email file, e.g., by clicking or otherwise selecting the visualize button 108 shown in FIG. 1A.

As shown, the routine 300 may begin at a step 302, at which the contents of the email file 110 may be parsed or otherwise analyzed to identify various features to be used in rendering the graphical representation for the GUI 114. Features that may be so identified may, for example, include a respective set of elements for each email communication that is reflected in the email thread represented in the file 110. With reference to FIG. 1A, for example, the email thread 100 may be determined to include respective email communications 102, 104, 106, and a separate set of elements may be ascertained for each such email communication. Separation between respective email communications, as well as the identity of various elements within each such email communication, may be determined, for example, based on the presence and/or locations of standard email field indicators, e.g., "From:", "Sent:", "To:", "Cc:", "Subject:", "Importance:", etc.

In addition to identifying the various elements within the email thread, the computing system 112 may ascertain links and/or associations between the identified elements. Such links and/or associations may be used, for example, to determine how to render the graphical representation for the GUI 114 as described below in connection with the remaining steps of the routine 300 and/or to facilitate user-interactivity with the GUI 114 as described below in connection with FIGS. 4 and 5. For example, the computing system 112 may determine that the email communication 102 (see FIG. 1A) is linked to User A (as a sender) and to User B (as a primary recipient) and to User C (as a carbon copy recipient), and may further determine that the email communication 102 is associated with a subject line of "Email Thread Example", a transmission date of "Oct. 23, 2019", a transmission time of "10:03 AM", and a "high" importance designation. In some implementations, the computing system 112 may further identify relationships amongst the various email communications included in the thread, such as which email communications were appended to which other email communications in the thread. Such relationships may, for example, help determine whether a particular individual sent or received any correspondence that included a particular email communication, as discussed in more detail below in connection with step 428 of the routine 400 (shown in FIG. 4) and step 520 of the routine 500 (shown in FIG. 5).

At a step 304 of the routine 300, the computing system 112 may evaluate the elements of the email thread that represent individuals to determine the names of the respective participants as well as categories into which participant icons 118 are to be distributed when rendering graphical representation for the GUI 114. In some embodiments, for at least some such individuals, the computing system 112 may determine one or more of: (1) the individual's name, (2) the name of the company with which the individual is associated, and (3) the individual's job title within that company.

The participants' names, employers, and/or job titles may, in some implementations, be ascertained by using the email addresses associated with the respective messages to identify profiles containing such information within a "contacts" list associated with an email application, and retrieving the pertinent data from those profiles. In some implementations, information within the email thread itself (e.g., names and titles within "signature" paragraphs) may be leveraged to identify pertinent data for labeling and/or categorization of individuals. In some implementations, user-specific data from one or more other sources may additionally or alternatively be used to ascertain the names, employers, and/or job titles of the various participants in the email thread in question. Additionally or alternatively, in some implementations, portions of the email address itself may be used as the name and employer information for rendering the graphical representation for the GUI 114. For example, the portion of each email address preceding the "@" symbol may treated as the individual's "name" and the top level domain within the email address may be treated as the individual's "employer." In such a case, the participant icons 118 may be distributed into "company" categories and labeled with "names" without referencing any resources beyond the email thread itself. Other categorization schemes, using the same or different categorization criteria, are also possible, depending on the nature of the user-specific data that is available to the computing system 112.

In some embodiments, once the names of the various participants are known, the bodies of the respective email communications 102, 104, 106 in the email thread 100 may be searched to determine which, if any, of those email communications contain the names (in whole or in part, e.g., first name and/or last name) of such participants. Any email communications that mention particular individuals may then be linked to the participant icons 118 representing such individuals so that messages mentioning particular individuals may subsequently be identified when a user interacts with the GUI 114, e.g., as discussed below in connection with the steps 522 and 524 of the routine 500 (shown in FIG. 5).

At a step 306, the computing system 112 may evaluate the identified features to determine the participant icons 118 and message icons 120 that are to be used to render the graphical representation for the GUI. 114. In some embodiments, for entities corresponding to the body of an email communication, such as the email communication 102 shown in FIG. 1A, a respective first message icon type 120a may be assigned for primary addressees of the message, and a respective second icon type 120b may be assigned for carbon copy addressees of that same message. Thus, for the email communication 102, two message icons 120 may be assigned, with one of them (i.e., a message icon type 120a) being associated with the primary addressee, i.e., User B, and the other one (i.e., a message icon type 120b) being associated with the carbon copied addressee of that email communication, i.e., User C. As shown in FIG. 1B, each such message icon 120 may have an arrow or similar directional element pointing toward a "recipient end," i.e., an end of the message icon 120 corresponding to the recipient of the email communication, and away from a "sender end," i.e., the end of the message icon 120 corresponding to the sender of the email communication.

In some embodiments, the assigned message icons 120 may also have participant icons 118 (representing the receiver of the email communication corresponding to that message icon 120) assigned to their recipient ends. In some implementations, the types of participant icons 118 that are assigned to such recipient ends may depend upon the groups into which the individuals corresponding to those participant icons 118 have been categorized. Further, for message icons 120 that are associated with first listed primary addressees of email communications, or first listed carbon copied addressees if there are no primary addressees, participant icons 118 (representing the sender of the email communication corresponding to that message icon 120) may be assigned to their sender ends. And again, in some implementations, the types of participant icons 118 that are assigned to such sender ends may depend upon the groups into which the individuals corresponding to those participant icons 118 have been categorized. In some implementations, the sender ends of the remaining message icons 120 associated with the same email communication, e.g., the email communication 102 shown in FIG. 1A, may not have participant icons assigned to them, so as to reduce the clutter on the resulting graphical representation on the GUI 114. In such an implementation, a user may readily ascertain that when one or more message icons 120 that lack participant icons 118 at their sender end are positioned below another message icon 120 that includes a participant icon 118 at its sender end, all such messages originated from the same sender. For instance, with reference to FIG. 1B, because the message icon 120a has the participant icon 118 positioned at its sender end and the message icon 120b is directly below message icon 120a, a user may readily ascertain the email communication represented by message icon 120b originated from User A, even though the message icon 120a does not also have a participant icon 118 positioned at its sender end. In some embodiments, the message icons 120 representing such duplicate messages may be differentiated in some manner from the message icons 120 representing the primary message, such as by using different colors, textures, shading, highlighting, or the like. In the graphical representation shown in FIG. 1B, for example, the duplicate message icon 120b is depicted as a dashed line, whereas the primary message icon 120a is depicted as a solid line.

At a step 308 of the routine 300, the computing system 112 may determine appropriate labels or other indicators that are to be associated with the respective participant icons 118 determined in the step 306. In some implementations, some or all of the information determined in the step 304 (e.g., individual names, employer names, job titles) may be used for this purpose. As a result of the step 308, participant icons 118 may have labels or other indicators associated with them for use in rendering the graphical representation for the GUI 114, as described in more detail below.

At a step 310 of the routine 300, the computing system 112 may determine appropriate labels or other indicators that are to be associated with the respective message icons 120 determined in the step 306. In some implementations, such labels or other indicators may be determined based on the associations between elements that were determined at the step 302. As a result of the step 310, message icons 120 may have labels or other indicators associated with them for use in rendering the graphical representation for the GUI 114, as described in more detail below. With reference to FIG. 1B, examples of such labels/indicators include "!", "RE:", "FW:", and "Cc:".

At a step 312 of the routine 300, the computing system 112 may determine abstracts for the respective email communications in the email thread in question. For the illustrative email thread shown in FIG. 1A, for example, the computing system 112 may determine message abstracts for the email communications 102, 104, and 106 of the email thread 100. In some embodiments, such message abstracts may be simply the first several words of the email communication followed by ellipses to indicate the message has been abbreviated. In some implementations, a process may additionally or alternatively be used to ascertain a more meaningful abstract, such as by identifying a handful of key nouns or verbs from the email communication that may provide more insight into its substance.

At a step 314 of the routine 300, the computing system 112 may render a graphical representation including the message icons 120 and participant icons 118 determined at the step 306 to facilitate a user's understanding and accessibility to content of email files for an email system. In some embodiments, the messages icons 120 may be rendered chronologically based on the date/time information associated with the email communications they represent, e.g., as determined at the step 302. In the example shown in FIG. 1B, for instance, the message icons 120 are rendered so as to represent email communications in time order from top to bottom of graphical representation for the GUI 114. Any participant icons 118 determined to be associated with the sender and receiver ends of such message icons 120 may also be rendered at locations corresponding to the categories into which the individuals those participant icons 118 represent were assigned.

At a step 316 of the routine 300, the computing system 112 may render the labels or other indicators that were determined at the steps 308 and 310 for the participant icons 118 and message icons 120, respectively, at appropriate locations on the graphical representation for the GUI 114.

Finally, at a step 318 of the routine 300, in some embodiments, the computing system 112 may optionally highlight or otherwise indicate any of the participant icons 118 in the graphical representation that correspond to the user who is currently operating the GUI 114. As shown in FIGS. 1B-1E, for example, the participant icons 118 corresponding to User B (who is the current user of the GUI 114 in that example) may initially be highlighted (e.g., see highlighting 152). Highlighting or otherwise indicating those icons may, for example, facilitate that user's ability to quickly understand his or her role within the email thread as a whole. As explained in more detail below, in some embodiments, the user operating the GUI 114 may take further actions to reveal additional information within the graphical representation relating to that user's icons, may remove highlighting or other indications relating to that user's icons, and/or may cause participant icons 118 corresponding to one or more other individuals to be highlighted or otherwise indicated for various purposes.

Figure 4:
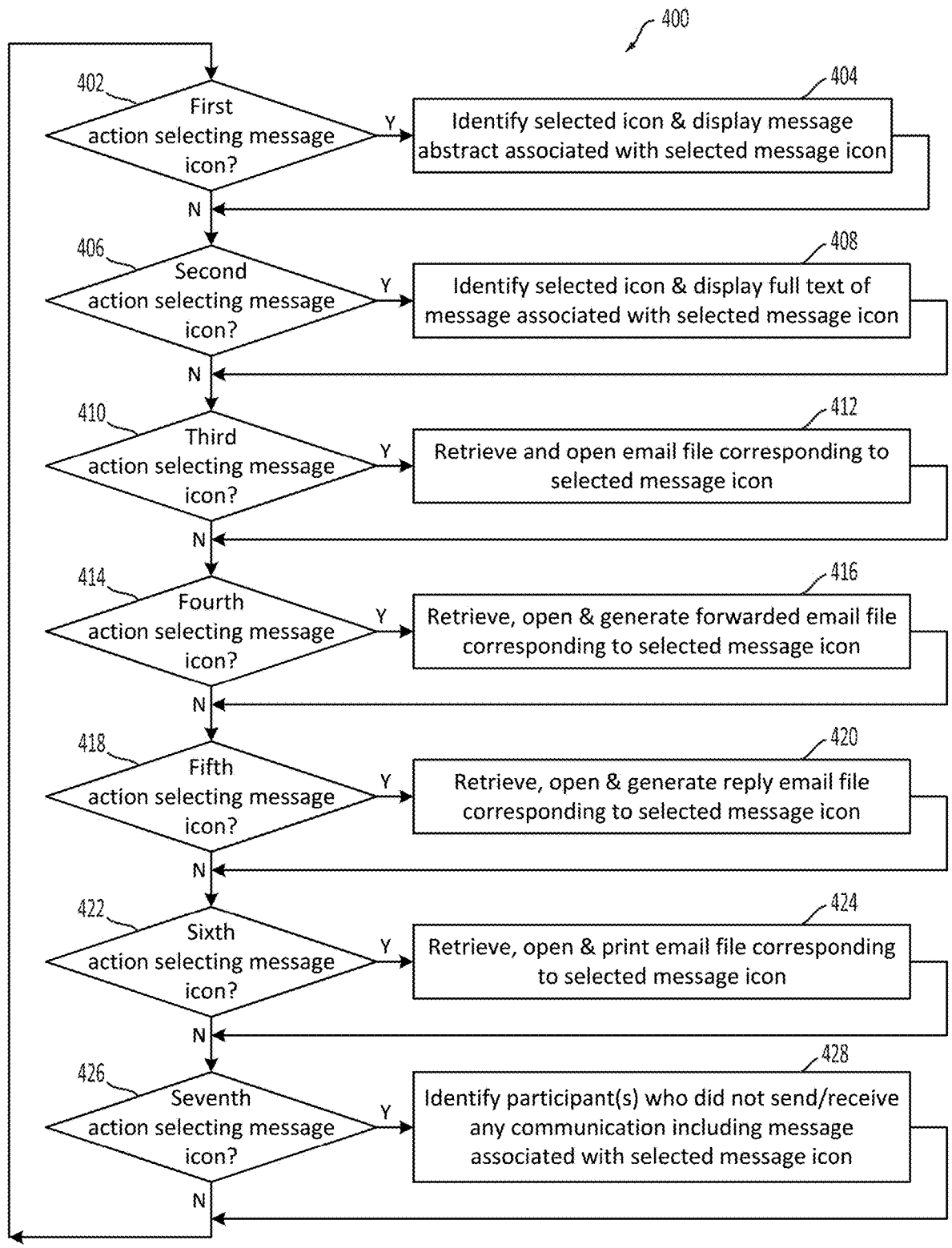
FIG. 4. shows an example routine that may be performed by a computing system to detect and process user interactions with message icons of a GUI such as that depicted in FIGS. 1B-E.
Figure 5:
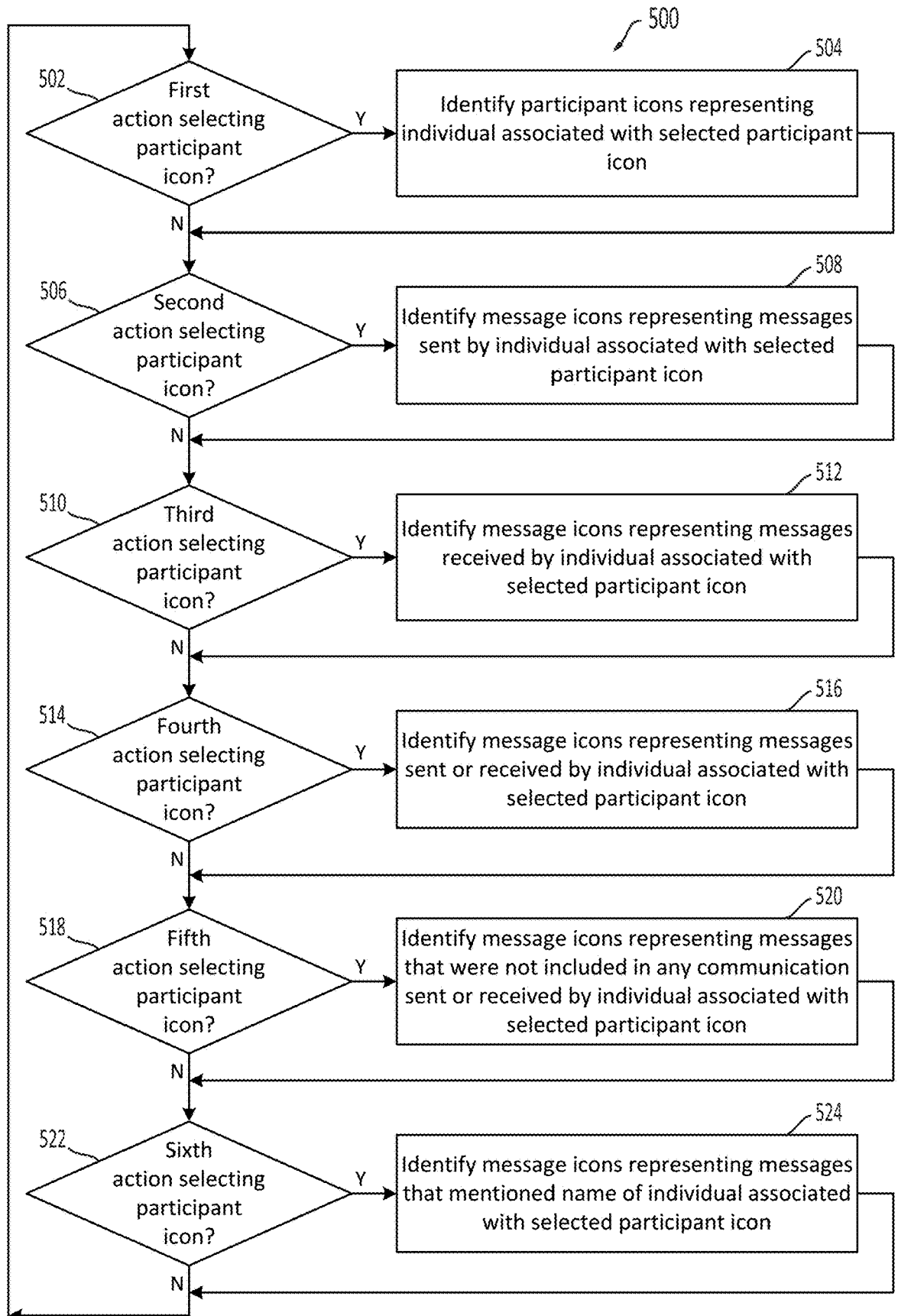
FIG. 5. shows an example routine that may be performed by a computing system to detect and process user interactions with participant icons of a GUI such as that depicted in FIGS. 1B-E.

FIGS. 4 and 5 show examples of routines that may be executed by the computing system 112 to allow a user to interact with the GUI 114 (shown in FIG. 1B) to enable the user to quickly and seamlessly identify and/or access particular portions of the email file's content that are of particular interest to that user. In particular, FIGS. 4 and 5 illustrate examples of functions that may be performed by the GUI 114 in response to a user taking various actions selecting individual message icons 120 and participant icons 118. In the routine 400 shown in FIG. 4, seven different actions for selecting a message icon 120 are referenced simply as "first action selecting message icon," "second action selecting message icon," and so forth. Similarly, in the routine 500 shown in FIG. 5, six different actions for selecting a participant icon 118 are referenced simply as "first action selecting participant icon," "second action selecting particular icon," and so forth. In this respect, it should be appreciated that the respective icons 118, 120 may be selected in any of a number of ways to yield the different results described herein. The same icon 118, 120 may be selected in different ways, for example, by hovering a mouse cursor over the icon, by clicking on the icon and holding the mouse button, by clicking on the icon and releasing the mouse button, by double clicking the icon, by right-clicking on the icon and selecting an action from a dropdown menu, by single-tapping the icon on a touchscreen, by double-tapping the icon on a touchscreen, by touching and holding a finger or stylus on the icon on a touchscreen to reveal a dropdown menu option, by selecting a radio button or check box for an action type prior to or after selecting the icon, using radio buttons and/or check boxes to identify both selected icons and actions to be taken with respect to such icons. Thus, although some examples of icon selection techniques are provided herein, it should be appreciated that any of a number of different techniques may additionally or alternatively be employed in some embodiments.

Referring first to FIG. 4, at a decision step 402 of the routine 400, a determination may be made as to whether the computing system 112 detects a first action selecting a message icon 120. The first action may, for example, correspond to a user hovering a mouse cursor over a particular message icon 120, as described above in connection with FIG. 1C. As FIG. 1C illustrates, in response to detecting selection of a message icon 120 using the first action, the routine 400 may proceed to a step 404, at which the selected icon 120 may be indicated on the GUI 114 (e.g., by bolding it as illustrated, or by highlighting it, coloring it differently, etc.) and a message abstract (as determined at the step 312 of the routine 300 shown in FIG. 3) may be displayed on the GUI 114, e.g., in a message bubble 144 associated with the selected message icon 120. The user may thus move the mouse cursor about the GUI 114, viewing the respective message abstracts as the mouse hovers over the different message icons 120.

At a decision step 406 of the routine 400, a determination may be made as to whether the computing system 112 detects a second action selecting a message icon 120. The second action may, for example, correspond to a user clicking and holding a mouse button when the mouse cursor is over a particular message icon 120, as described above in connection with FIG. 1D. As FIG. 1D illustrates, in response to detecting selection of a message icon 120 using the second action, the routine 400 may proceed to a step 408, at which the selected icon 120 may be indicated on the GUI 114 (e.g., by bolding it as illustrated, or by highlighting it, coloring it differently, etc.) and a larger portion, and perhaps, as illustrated, even the entirety of the message corresponding to the selected message icon 120, may be presented, e.g., in a larger message bubble 146. The user may thus move the mouse cursor about the GUI 114, clicking and holding the cursor on respective message icons 120 to view the entirety of different email communications within the represented email thread.

At a decision step 410 of the routine 400, a determination may be made as to whether the computing system 112 detects a third action selecting a message icon 120. The third action may, for example, correspond to a user double-clicking on a particular message icon 120, as described above in connection with FIG. 1E. As FIG. 1E illustrates, in response to detecting selection of a message icon 120 using the third action, the routine 400 may proceed to a step 412, at which the computing system 112 may attempt to identify an email file corresponding to the selected message icon 120 and, if such an email is accessible, open such a file in a new window 150. The user may then take any actions the user would ordinarily take with an open email file, such as forwarding it to another individual, replying to the individual who sent the email message, printing a hard copy of it, etc. In some embodiments, for example, the computing system 112 may use one or more application programming interface (API) functions of the email application to search for, retrieve, and open the pertinent email file from the user's email folders.

At a decision step 414 of the routine 400, a determination may be made as to whether the computing system 112 detects a fourth action selecting a message icon 120. The fourth action may, for example, correspond to a user right-clicking on a particular message icon 120 and selecting "forward" from a drop-down menu. In response to detecting selection of a message icon 120 using the fourth action, the routine 400 may proceed to a step 416, at which the computing system 112 may not only identify an email file corresponding to the selected message icon 120 and open such a file, such as described above in connection with the step 412, but may also open a forwarded version of the email file in a new window. The user who made the selection may thus simply enter a desired addressee's email address into the address field of the opened email, possibly type a message to accompany the to-be-forwarded email, and click "send" to cause such an email to be forwarded to the desired recipient.

At a decision step 418 of the routine 400, a determination may be made as to whether the computing system 112 detects a fifth action selecting a message icon 120. The fifth action may, for example, correspond to a user right-clicking on a particular message icon 120 and selecting "reply" from a drop-down menu. In response to detecting selection of a message icon 120 using the fifth action, the routine 400 may proceed to a step 420, at which the computing system 112 may not only identify an email file corresponding to the selected message icon 120 and open such a file, such as described above in connection with the step 412, but may also open a reply version of the email file in a new window. The user who made the selection may thus simply type a reply message and click "send" to cause the reply email to be sent.

At a decision step 422 of the routine 400, a determination may be made as to whether the computing system 112 detects a sixth action selecting a message icon 120. The sixth action may, for example, correspond to a user right-clicking on a particular message icon 120 and selecting "print" from a drop-down menu. In response to detecting selection of a message icon 120 using the sixth action, the routine 400 may proceed to a step 424, at which the computing system 112 may not only identify an email file corresponding to the selected message icon 120 and open such a file, such as described above in connection with the step 412, but may also cause a process to be invoked for sending the email to printer.

At a decision step 426 of the routine 400, a determination may be made as to whether the computing system 112 detects a seventh action selecting a message icon 120. The seventh action may, for example, correspond to a user right-clicking on a particular message icon 120 and selecting "show who didn't' see this" or the like from a drop-down menu. In response to detecting selection of a message icon 120 using the seventh action, the routine 400 may proceed to a step 428, at which the computing system 112 may determine which, if any, individuals did not send or receive at least one email communication that included the message represented by the selected message icon 120, and may then highlight or otherwise identify the participant icons 118 corresponding to any such individuals on the GUI 114.

Referring next to FIG. 5, at a decision step 502 of the routine 500, a determination may be made as to whether the computing system 112 detects a first action selecting a participant icon 118. The first action may, for example, correspond to a user single-clicking on a particular message icon 120. As noted above in connection with step 318 of the routine 300 (shown in FIG. 3), in some embodiments, when initially rending a graphical representation for the GUI 114, the computing system 112 may highlight or otherwise indicate any of the participant icons 118 in the graphical representation that correspond to the user who is currently operating the GUI 114, thus allowing the current user to quickly appreciate his or her role within the email thread in question. In some embodiments, selecting a different participant icon 118 using the first action (e.g., single clicking) may cause the routine 500 to proceed to a step 504, at which the computing system 112 may instead (or additionally) highlight the participant icons 118 that represent the same user as the selected participant icon 118. In some implementation, using the first action to again select the same participant icon 118 may cause the highlighting or other indication to disappear for the corresponding group of participant icons 118, thus allowing the user to selectively toggle each such set of participant icons 118 (corresponding to a particular individual) between a selected state and an unselected state.

At a decision step 506 of the routine 500, a determination may be made as to whether the computing system 112 detects a second action selecting a participant icon 118. The second action may, for example, correspond to a user right-clicking on a particular participant icon 118 and selecting "show messages sent by" or the like from a drop-down menu. In response to detecting selection of a participant icon 118 using the second action, the routine 500 may proceed to a step 508, at which the computing system 112 may, e.g., using the associations identified at the step 302 of the routine 300 (shown in FIG. 3), determine which, if any, email communications were sent by the individual represented by the selected participant icon 118, and may then highlight or otherwise identify the message icons 120 that represent those email communications.

At a decision step 510 of the routine 500, a determination may be made as to whether the computing system 112 detects a third action selecting a participant icon 118. The third action may, for example, correspond to a user right-clicking on a particular participant icon 118 and selecting "show messages received by" or the like from a drop-down menu. In response to detecting selection of a participant icon 118 using the third action, the routine 500 may proceed to a step 512, at which the computing system 112 may, e.g., using the associations identified at the step 302 of the routine 300 (shown in FIG. 3), determine which, if any, email communications were received by the individual represented by the selected participant icon 118, and may then highlight or otherwise identify the message icons 120 that represent those email communications.

At a decision step 514 of the routine 500, a determination may be made as to whether the computing system 112 detects a fourth action selecting a participant icon 118. The fourth action may, for example, correspond to a user right-clicking on a particular participant icon 118 and selecting "show messages sent or received by" or the like from a drop-down menu. In response to detecting selection of a participant icon 118 using the fourth action, the routine 500 may proceed to a step 516, at which the computing system 112 may, e.g., using the associations identified at the step 302 of the routine 300 (shown in FIG. 3), determine which, if any, email communications were either sent by or received by the individual represented by the selected participant icon 118, and may then highlight or otherwise identify the message icons 120 that represent those email communications.

At a decision step 518 of the routine 500, a determination may be made as to whether the computing system 112 detects a fifth action selecting a participant icon 118. The fifth action may, for example, correspond to a user right-clicking on a particular participant icon 118 and selecting "show message not seen by" or the like from a drop-down menu. In response to detecting selection of a participant icon 118 using the fifth action, the routine 500 may proceed to a step 520, at which the computing system 112 may, e.g., using the associations identified at the step 302 of the routine 300 (shown in FIG. 3), determine which, if any, email communications were not include in any communication that was sent or received by the individual represented by the selected participant icon 118. The message icons 120 that represent those email communications may then be highlighted or otherwise indicated on the GUI 114 to flag those messages the individual represented by the selected participant icon 118 is unlikely to have seen.

At a decision step 522 of the routine 500, a determination may be made as to whether the computing system 112 detects a sixth action selecting a participant icon 118. The sixth action may, for example, correspond to a user right-clicking on a particular participant icon 118 and selecting "show messages mentioning this person" or the like from a drop-down menu. In response to detecting selection of a participant icon 118 using the sixth action, the routine 500 may proceed to a step 524, at which the computing system 112 may determine which, if any, email communications mention the name (in whole or in part, e.g., first and/or last name) of the individual represented by the selected participant icon 118. The message icons 120 that represent those email communications may then be highlighted or otherwise indicated on the GUI 114 to flag those messages that mention the name of the individual represented by the selected participant icon 118. The manner in which participant icons 118 may be linked to message icons 120 that represent email communications mentioning names of the individuals represented by such participant icons 118 is discussed above in connection with FIG. 3.

D. Example Implementations of Methods, Systems, and Computer-Readable Media in Accordance with the Present Disclosure The following paragraphs (M1) through (M21) describe examples of methods that may be implemented in accordance with the present disclosure.

(M1) A method performed by a computing system may involve parsing contents of an email file to determine a first individual who sent a first email communication represented in the file and a second individual who received the first email communication; presenting, by a display screen, a graphical user interface including a graphical representation of at least the first email communication, the graphical representation including a first icon representing the first individual, a second icon representing the second individual, and a third icon representing the first email communication that was sent from the first individual to the second individual; determining a selection of an icon from among at least the first icon, the second icon, and the third icon; determining that at least a first portion of the contents has a first relationship with the selected icon; and presenting, based at least in part on determining that the first portion has the first relationship with the selected icon, an indication on the display screen corresponding to the first portion.

(M2) A method may be performed as described in paragraph (M1), wherein determining the selection may indicate selection of the third icon, determining that the first portion has the first relationship with the selected icon may indicate that first text represented in the contents is included in the first email communication represented by the third icon, and presenting the indication may further include display the first text on the display screen.

(M3) A method may be performed as described in paragraph (M1) or paragraph (M2), wherein display of the third icon may include an abstract of the first text.

(M4) A method may be performed as described in any of paragraphs (M1) through paragraph (M3), wherein presenting the third icon may include display of the third icon as an arrow pointing from the first icon to the second icon.

(M5) A method may be performed as described in any of paragraphs (M1) through paragraph (M4), wherein the email file may represent a plurality of email communications in an email thread, determining the selection may indicate selection of the first icon, and presenting the indication may include an identification of at least one email communication that was not included in any email communication sent or received by the first individual.

(M6) A method may be performed as described in any of paragraphs (M1) through paragraph (M4), wherein the email file may represent a plurality of email communications in an email thread, determining the selection may indicate selection of the third icon, and presenting the indication may include an identification of at least one other participant in the email thread who did not send or receive the first email communication.

(M7) A method may be performed as described in any of paragraphs (M1) through (M6), and may further comprise rendering, by the computing system, the graphical representation to indicate that the first individual is included in a first category and that the second individual is included in a second category so as to enable the user to select the icon based on knowledge that the first user is in the first category and the second user is in the second category.

(M8) A method may be performed as described in any of paragraphs (M1) through paragraph (M7), wherein rendering the graphical representation may further comprise causing a first set of one or more icons corresponding to individuals in the first category to appear in a different region of the graphical representation than a second set of one or more icons corresponding to individuals in the second category so as to enable the user to select the icon based on knowledge that the first user is in the first category and the second user is in the second category.

(M9) A method may be performed as described in any of paragraphs (M1) through paragraph (M8), wherein the first and second categories of individuals may correspond, respectively, to first and second roles in a business organization, and wherein the method may further comprise obtaining, from a source external to the email file, information indicating that the first individual has the first role and the second individual has the second role, indicating, on the graphical representation, that the first set of one or more icons represents individuals having the first role, and indicating, on the graphical representation, that the second set of one or more icons represents individuals having the second role.

(M10) A method may be performed as described in any of paragraphs (M1) through paragraph (M9), wherein determining the selection may indicate selection of the third icon, and presenting the indication may include an identification of a second email file corresponding to the first email communication.

(M11) A method may be performed as described in any of paragraphs (M1) through paragraph (M10), and may further comprise determining that the selection of the third icon further indicates that the second email file is to be accessed, retrieving the second email file from a first data store associated with the first individual or from a second data store associated with the second individual, and opening the second email file in a new window of the display screen.

(M12) A method may be performed as described in any of paragraphs (M1) through paragraph (M11), wherein determining the selection may indicate that an email corresponding to the first email communication is to be replied to or forwarded, and the method may further comprise retrieving, from a first data store associated with the first individual or from a second data store associated with the second individual, a second email file representing the first email communication, generating a third email file as a forwarded or reply version of the second email file, and opening the third email file in a new window of the display screen.

(M13) A method may be performed as described in any of paragraphs (M1) through paragraph (M12), and may further comprise determining that a characteristic of the first individual, the second individual, or the first email communication satisfies a first criterion, and including, in the graphical representation, a feature indicating that the characteristic of the first individual, the second individual, or the first email communication satisfies the first criterion.

(M14) A method may be performed as described in paragraph (M13), wherein the first criterion is that the first email communication includes at least one keyword, and the feature indicates that the first email communication includes the at least one keyword.

(M15) A method may be performed as described in paragraph (M13), wherein the first criterion is that the first individual is a person operating the graphical user interface, and the feature indicates that the first icon represents the person operating the graphical user interface.

(M16) A method may be performed as described in paragraph (M13), wherein the first criterion is that the first individual is unavailable, and the feature indicates the first individual represented by the first icon is unavailable.

(M17) A method may be performed as described in paragraph (M13), wherein the first criterion is that the first email communication is not associated with a reply email communication from the second individual, and the feature indicates that the second individual has not replied to the first email communication.

(M18) A method may be performed as described in any of paragraphs (M1) through paragraph (M17), wherein the email file may represent a plurality of email communications in an email thread, determining the selection may indicate selection of the first icon, determining that the first portion has the first relationship with the selected icon may indicate that one or more of the plurality of email communications were sent by the first individual, and presenting the indication may further comprise indicating, on the display screen, that the one or more of the plurality of email communications were sent by the first individual.

(M19) A method may be performed as described in any of paragraphs (M1) through paragraph (M18), wherein the email file represents a plurality of email communications in an email thread, determining the selection may indicate selection of the first icon, determining that the first portion has the first relationship with the selected icon may indicate that one or more of the plurality of email communications were sent or received by the first individual, and presenting the indication may further comprise indicating, on the display screen, that the one or more of the plurality of email communications were sent or received by the first individual.

(M20) A method may be performed as described in any of paragraphs (M1) through paragraph (M19), wherein the email file may represent a plurality of email communications in an email thread, determining the selection may indicate selection of the second icon, determining that the first portion has the first relationship with the selected icon may indicate that one or more of the plurality of email communications were received by the second individual, presenting the indication may further comprise indicating, on the display screen, that the one or more of the plurality of email communications were received by the second individual.

(M21) A method may be performed as described in any of paragraphs (M1) through paragraph (M20), wherein the email file may represent a plurality of email communications in an email thread, determining the selection may indicate selection of the first icon, determining that the first portion has the first relationship with the selected icon may indicate that the first individual also sent or received one or more of the plurality of email communications other than the first email communication, presenting the indication may further include an identification, on the display screen, one or more additional icons representing the first individual.

The following paragraphs (S1) through (S21) describe examples of systems that may be implemented in accordance with the present disclosure.

(S1) A system may include at least one processor and at least one computer-readable medium encoded with instructions which, when executed by the at least one processor, cause the system to parse contents of an email file to determine a first individual who sent a first email communication represented in the file and a second individual who received the first email communication, to present, by a display screen, a graphical user interface including a graphical representation of at least the first email communication, the graphical representation including a first icon representing the first individual, a second icon representing the second individual, and a third icon representing the first email communication that was sent from the first individual to the second individual, to determine a selection of an icon from among at least the first icon, the second icon, and the third icon, to determine that at least a first portion of the contents has a first relationship with the selected icon, and to present, based at least in part on determining that the first portion has the first relationship with the selected icon, an indication on the display screen corresponding to the first portion.

(S2) A system may be configured as described in paragraph (S1), and the at least one computer-readable medium may be further encoded with additional instructions which, when executed by the at least one processor, further cause the system to determine selection of the third icon, to determine that the first portion has the first relationship with the selected icon at least in part by determining that first text represented in the contents is included in the first email communication represented by the third icon, and to present the indication on the display screen at least in part by presenting the first text on the display screen.

(S3) A system may be configured as described in paragraph (S1) or paragraph (S2), and the at least one computer-readable medium may be further encoded with additional instructions which, when executed by the at least one processor, further cause the system to present the third icon on the display screen at least in part by causing the third icon to include an abstract of the first text.

(S4) A system may be configured as described in any of paragraphs (S1) through (S3), wherein the at least one computer-readable medium may be further encoded with additional instructions which, when executed by the at least one processor, further cause the system to present the third icon on the display screen at least in part by presenting the third icon as an arrow pointing from the first icon to the second icon.

(S5) A system may be configured as described in any of paragraphs (S1) through (S4), wherein the email file may represent a plurality of email communications in an email thread, and the at least one computer-readable medium may be further encoded with additional instructions which, when executed by the at least one processor, further cause the system to determine selection of the first icon, and to present the indication on the display screen at least in part by identifying at least one email communication that was not included in any email communication sent or received by the first individual.

(S6) A system may be configured as described in any of paragraphs (S1) through (S5), wherein the email file may represent a plurality of email communications in an email thread, and the at least one computer-readable medium may be further encoded with additional instructions which, when executed by the at least one processor, further cause the system to determine selection of the third icon, and to present the indication on the display screen at least in part by identifying at least one other participant in the email thread who did not send or receive the first email communication.

(S7) A system may be configured as described in any of paragraphs (S1) through (S6), wherein the at least one computer-readable medium may be further encoded with additional instructions which, when executed by the at least one processor, further cause the system to render the graphical representation to indicate that the first individual is included in a first category and that the second individual is included in a second category so as to enable the user to select the icon based on knowledge that the first user is in the first category and the second user is in the second category.

(S8) A system may be configured as described in any of paragraphs (S1) through (S7), wherein the at least one computer-readable medium may be further encoded with additional instructions which, when executed by the at least one processor, further cause the system to render the graphical representation at least in part by causing a first set of one or more icons corresponding to individuals in the first category to appear in a different region of the graphical representation than a second set of one or more icons corresponding to individuals in the second category so as to enable the user to select the icon based on knowledge that the first user is in the first category and the second user is in the second category.

(S9) A system may be configured as described in any of paragraphs (S1) through (S9), wherein the first and second categories of individuals may correspond, respectively, to first and second roles in a business organization, and the at least one computer-readable medium may be further encoded with additional instructions which, when executed by the at least one processor, further cause the system to obtain, from a source external to the email file, information indicating that the first individual has the first role and the second individual has the second role, to indicate, on the graphical representation, that the first set of one or more icons represents individuals having the first role, and to indicate, on the graphical representation, that the second set of one or more icons represents individuals having the second role.

(S10) A system may be configured as described in any of paragraphs (S1) through (S9), wherein the at least one computer-readable medium may be further encoded with additional instructions which, when executed by the at least one processor, further cause the system to determine selection of the third icon, and to present the indication on the display screen at least in part by identifying a second email file corresponding to the first email communication.

(S11) A system may be configured as described in any of paragraphs (S1) through (S10), wherein the at least one computer-readable medium may be further encoded with additional instructions which, when executed by the at least one processor, further cause the system to determine selection of the third icon, to determine that the selection of the third icon further indicates that the second email file is to be accessed, to retrieve the second email file from a first data store associated with the first individual or from a second data store associated with the second individual, and to open the second email file in a new window of the display screen.

(S12) A system may be configured as described in any of paragraphs (S1) through (S1), wherein the at least one computer-readable medium may be further encoded with additional instructions which, when executed by the at least one processor, further cause the system to determine selection of the third icon, to determine that the selection of the third icon indicates that an email corresponding to the first email communication is to be replied to or forwarded, to retrieve, from a first data store associated with the first individual or from a second data store associated with the second individual, a second email file representing the first email communication, to generate a third email file as a forwarded or reply version of the second email file, and to open the third email file in a new window of the display screen.

(S13) A system may be configured as described in any of paragraphs (S1) through (S12), wherein the at least one computer-readable medium may be further encoded with additional instructions which, when executed by the at least one processor, further cause the system to determine that a characteristic of the first individual, the second individual, or the first email communication satisfies a first criterion, and to include, in the graphical representation, a feature indicating that the characteristic of the first individual, the second individual, or the first email communication satisfies the first criterion.

(S14) A system may be configured as described in paragraph (S13), wherein the first criterion is that the first email communication includes at least one keyword, and the feature indicates that the first email communication includes the at least one keyword.

(S15) A system may be configured as described in paragraph (S13), wherein the first criterion is that the first individual is a person operating the graphical user interface, and the feature indicates that the first icon represents the person operating the graphical user interface.

(S16) A system may be configured as described in paragraph (S13), wherein the first criterion is that the first individual is unavailable, and the feature indicates the first individual represented by the first icon is unavailable.

(S17) A system may be configured as described in paragraph (S13), wherein the first criterion is that the first email communication is not associated with a reply email communication from the second individual, and the feature indicates that the second individual has not replied to the first email communication.

(S18) A system may be configured as described in any of paragraphs (S1) through (S17), wherein the email file may represent a plurality of email communications in an email thread, and the at least one computer-readable medium may be further encoded with additional instructions which, when executed by the at least one processor, further cause the system to determine selection of the first icon, to determine that the first portion has the first relationship with the selected icon at least in part by determining that one or more of the plurality of email communications were sent by the first individual, and to present the indication on the display screen at least in part by indicating that the one or more of the plurality of email communications were sent by the first individual.

(S19) A system may be configured as described in any of paragraphs (S1) through (S18), wherein the email file may represent a plurality of email communications in an email thread, and the at least one computer-readable medium may be further encoded with additional instructions which, when executed by the at least one processor, further cause the system to determine selection of the second icon, to determine that the first portion has the first relationship with the selected icon at least in part by determining that one or more of the plurality of email communications were received by the second individual, and to present the indication on the display screen at least in part by indicating that the one or more of the plurality of email communications were received by the second individual.

(S20) A system may be configured as described in any of paragraphs (S1) through (S19), wherein the email file may represent a plurality of email communications in an email thread, and the at least one computer-readable medium may be further encoded with additional instructions which, when executed by the at least one processor, further cause the system to determine selection of the first icon, to determine that the first portion has the first relationship with the selected icon at least in part by determining that one or more of the plurality of email communications were sent or received by the first individual, and to present the indication on the display screen at least in part by indicating that the one or more of the plurality of email communications were sent or received by the first individual.

(S21) A system may be configured as described in any of paragraphs (S1) through (S20), wherein the email file may represent a plurality of email communications in an email thread, and the at least one computer-readable medium may be further encoded with additional instructions which, when executed by the at least one processor, further cause the system to determine selection of the first icon, to determine that the first portion has the first relationship with the selected icon at least in part by determining that the first individual also sent or received one or more of the plurality of email communications other than the first email communication, and to present the indication on the display screen at least in part by identifying one or more additional icons representing the first individual.

The following paragraphs (CRM1) through (CRM21) describe examples of computer-readable media that may be implemented in accordance with the present disclosure.

(CRM1) At least one computer-readable medium may be encoded with instructions which, when executed by at least one processor of a computing system, cause the computing system to parse contents of an email file to determine a first individual who sent a first email communication represented in the file and a second individual who received the first email communication, to present, by a display screen, a graphical user interface including a graphical representation of at least the first email communication, the graphical representation including a first icon representing the first individual, a second icon representing the second individual, and a third icon representing the first email communication that was sent from the first individual to the second individual, to determine a selection of an icon from among at least the first icon, the second icon, and the third icon, to determine that at least a first portion of the contents has a first relationship with the selected icon, and to present, based at least in part on determining that the first portion has the first relationship with the selected icon, an indication on the display screen corresponding to the first portion.

(CRM2) At least one computer-readable medium may be encoded with instructions as described in paragraph (CRM1), and may be further encoded with additional instructions which, when executed by the at least one processor, further cause the computing system to determine selection of the third icon, to determine that the first portion has the first relationship with the selected icon at least in part by determining that first text represented in the contents is included in the first email communication represented by the third icon, and to present the indication on the display screen at least in part by presenting the first text on the display screen.

(CRM3) At least one computer-readable medium may be encoded with instructions as described in paragraph (CRM1) or paragraph (CRM2), and may be further encoded with additional instructions which, when executed by the at least one processor, further cause the computing system to present the third icon on the display screen at least in part by causing the third icon to include an abstract of the first text.

(CRM4) At least one computer-readable medium may be encoded with instructions as described in any of paragraphs (CRM1) through (CRM3), and may be further encoded with additional instructions which, when executed by the at least one processor, further cause the computing system to present the third icon on the display screen at least in part by presenting the third icon as an arrow pointing from the first icon to the second icon.

(CRM5) At least one computer-readable medium may be encoded with instructions as described in any of paragraphs (CRM1) through (CRM4), wherein the email file may represent a plurality of email communications in an email thread, and the at least one computer-readable medium may be further encoded with additional instructions which, when executed by the at least one processor, further cause the computing system to determine selection of the first icon, and to present the indication on the display screen at least in part by identifying at least one email communication that was not included in any email communication sent or received by the first individual.

(CRM6) At least one computer-readable medium may be encoded with instructions as described in any of paragraphs (CRM1) through (CRM5), wherein the email file may represent a plurality of email communications in an email thread, and the at least one computer-readable medium may be further encoded with additional instructions which, when executed by the at least one processor, further cause the computing system to determine selection of the third icon, and to present the indication on the display screen at least in part by identifying at least one other participant in the email thread who did not send or receive the first email communication.

(CRM7) At least one computer-readable medium may be encoded with instructions as described in any of paragraphs (CRM1) through (CRM6), and may be further encoded with additional instructions which, when executed by the at least one processor, further cause the computing system to render the graphical representation to indicate that the first individual is included in a first category and that the second individual is included in a second category so as to enable the user to select the icon based on knowledge that the first user is in the first category and the second user is in the second category.

(CRM8) At least one computer-readable medium may be encoded with instructions as described in any of paragraphs (CRM1) through (CRM7), and may be further encoded with additional instructions which, when executed by the at least one processor, further cause the computing system to render the graphical representation at least in part by causing a first set of one or more icons corresponding to individuals in the first category to appear in a different region of the graphical representation than a second set of one or more icons corresponding to individuals in the second category so as to enable the user to select the icon based on knowledge that the first user is in the first category and the second user is in the second category.

(CRM9) At least one computer-readable medium may be encoded with instructions as described in any of paragraphs (CRM1) through (CRM9), wherein the first and second categories of individuals may correspond, respectively, to first and second roles in a business organization, and the at least one computer-readable medium may be further encoded with additional instructions which, when executed by the at least one processor, further cause the computing system to obtain, from a source external to the email file, information indicating that the first individual has the first role and the second individual has the second role, to indicate, on the graphical representation, that the first set of one or more icons represents individuals having the first role, and to indicate, on the graphical representation, that the second set of one or more icons represents individuals having the second role.

(CRM10) At least one computer-readable medium may be encoded with instructions as described in any of paragraphs (CRM1) through (CRM9), and may be further encoded with additional instructions which, when executed by the at least one processor, further cause the computing system to determine selection of the third icon, and to present the indication on the display screen at least in part by identifying a second email file corresponding to the first email communication.

(CRM11) At least one computer-readable medium may be encoded with instructions as described in any of paragraphs (CRM1) through (CRM10), and may be further encoded with additional instructions which, when executed by the at least one processor, further cause the computing system to determine selection of the third icon, to determine that the selection of the third icon further indicates that the second email file is to be accessed, to retrieve the second email file from a first data store associated with the first individual or from a second data store associated with the second individual, and to open the second email file in a new window of the display screen.

(CRM12) At least one computer-readable medium may be encoded with instructions as described in any of paragraphs (CRM1) through (CRM1), and may be further encoded with additional instructions which, when executed by the at least one processor, further cause the computing system to determine selection of the third icon, to determine that the selection of the third icon indicates that an email corresponding to the first email communication is to be replied to or forwarded, to retrieve, from a first data store associated with the first individual or from a second data store associated with the second individual, a second email file representing the first email communication, to generate a third email file as a forwarded or reply version of the second email file, and to open the third email file in a new window of the display screen.

(CRM13) At least one computer-readable medium may be encoded with instructions as described in any of paragraphs (CRM1) through (CRM12), and may be further encoded with additional instructions which, when executed by the at least one processor, further cause the computing system to determine that a characteristic of the first individual, the second individual, or the first email communication satisfies a first criterion, and to include, in the graphical representation, a feature indicating that the characteristic of the first individual, the second individual, or the first email communication satisfies the first criterion.

(CRM14) At least one computer-readable medium may be encoded with instructions as described in paragraph (CRM13), wherein the first criterion may be that the first email communication includes at least one keyword, and the feature may indicate that the first email communication includes the at least one keyword.

(CRM15) At least one computer-readable medium may be encoded with instructions as described in paragraph (CRM13), wherein the first criterion may be that the first individual is a person operating the graphical user interface, and the feature may indicate that the first icon represents the person operating the graphical user interface.

(CRM16) At least one computer-readable medium may be encoded with instructions as described in paragraph (CRM13), wherein the first criterion may be that the first individual is unavailable, and the feature may indicate the first individual represented by the first icon is unavailable.

(CRM17) At least one computer-readable medium may be encoded with instructions as described in paragraph (CRM13), wherein the first criterion may be that the first email communication is not associated with a reply email communication from the second individual, and the feature may indicate that the second individual has not replied to the first email communication.

(CRM18) At least one computer-readable medium may be encoded with instructions as described in any of paragraphs (CRM1) through (CRM17), wherein the email file may represent a plurality of email communications in an email thread, and the at least one computer-readable medium may be further encoded with additional instructions which, when executed by the at least one processor, further cause the computing system to determine selection of the first icon, to determine that the first portion has the first relationship with the selected icon at least in part by determining that one or more of the plurality of email communications were sent by the first individual, and to present the indication on the display screen at least in part by indicating that the one or more of the plurality of email communications were sent by the first individual.

(CRM19) At least one computer-readable medium may be encoded with instructions as described in any of paragraphs (CRM1) through (CRM18), wherein the email file may represent a plurality of email communications in an email thread, and the at least one computer-readable medium may be further encoded with additional instructions which, when executed by the at least one processor, further cause the computing system to determine selection of the second icon, to determine that the first portion has the first relationship with the selected icon at least in part by determining that one or more of the plurality of email communications were received by the second individual, and to present the indication on the display screen at least in part by indicating that the one or more of the plurality of email communications were received by the second individual.

(CRM20) At least one computer-readable medium may be encoded with instructions as described in any of paragraphs (CRM1) through (CRM19), wherein the email file may represent a plurality of email communications in an email thread, and the at least one computer-readable medium may be further encoded with additional instructions which, when executed by the at least one processor, further cause the computing system to determine selection of the first icon, to determine that the first portion has the first relationship with the selected icon at least in part by determining that one or more of the plurality of email communications were sent or received by the first individual, and to present the indication on the display screen at least in part by indicating that the one or more of the plurality of email communications were sent or received by the first individual.

(CRM21) At least one computer-readable medium may be encoded with instructions as described in any of paragraphs (CRM1) through (CRM20), wherein the email file may represent a plurality of email communications in an email thread, and the at least one computer-readable medium may be further encoded with additional instructions which, when executed by the at least one processor, further cause the computing system to determine selection of the first icon, to determine that the first portion has the first relationship with the selected icon at least in part by determining that the first individual also sent or received one or more of the plurality of email communications other than the first email communication, and to present the indication on the display screen at least in part by identifying one or more additional icons representing the first individual.

Having thus described several aspects of at least one embodiment, it is to be appreciated that various alterations, modifications, and improvements will readily occur to those skilled in the art. Such alterations, modifications, and improvements are intended to be part of this disclosure, and are intended to be within the spirit and scope of the disclosure. Accordingly, the foregoing description and drawings are by way of example only.

Various aspects of the present disclosure may be used alone, in combination, or in a variety of arrangements not specifically discussed in the embodiments described in the foregoing and is therefore not limited in this application to the details and arrangement of components set forth in the foregoing description or illustrated in the drawings. For example, aspects described in one embodiment may be combined in any manner with aspects described in other embodiments.

Also, the disclosed aspects may be embodied as a method, of which an example has been provided. The acts performed as part of the method may be ordered in any suitable way. Accordingly, embodiments may be constructed in which acts are performed in an order different than illustrated, which may include performing some acts simultaneously, even though shown as sequential acts in illustrative embodiments.

Use of ordinal terms such as "first," "second," "third," etc. in the claims to modify a claim element does not by itself connote any priority, precedence or order of one claim element over another or the temporal order in which acts of a method are performed, but are used merely as labels to distinguish one claimed element having a certain name from another element having a same name (but for use of the ordinal term) to distinguish the claim elements.

Also, the phraseology and terminology used herein is used for the purpose of description and should not be regarded as limiting. The use of "including," "comprising," or "having," "containing," "involving," and variations thereof herein, is meant to encompass the items listed thereafter and equivalents thereof as well as additional items.

What is claimed is:

1. A method comprising:
   determining, by a computing system and based on contents of only a single email file, a first email communication represented in the email file and a second email communication represented in the email file, the second email communication being different than the first email communication;
   presenting, by a display screen of the computing system, a graphical user interface including a graphical representation of at least the first email communication and the second email communication, the graphical representation including a plurality of icons;
   determining, by the computing system, a selection of an icon from among the plurality of icons;
   determining that at least a first portion of the contents has a first relationship with the selected icon; and
   presenting, by the computing system and based at least in part on determining that the first portion has the first relationship with the selected icon, an indication on the display screen corresponding to the first portion.

2. The method of claim 1, wherein:
   determining the selection indicates selection of an icon representing the first email communication;
   determining that the first portion has the first relationship with the selected icon indicates that first text represented in the contents is included in the first email communication represented by the selected icon; and
   presenting the indication further includes display of the first text on the display screen.

3. The method of claim 2, wherein display of the selected icon includes an abstract of the first text.

4. The method of claim 1, wherein:
   the email file represents a plurality of email communications in an email thread;
   determining the selection indicates selection of an icon representing an individual who sent the first email communication; and
   presenting the indication further includes an identification of at least one email communication in the email thread that was not included in any email communication in the email thread that was sent or received by the individual.

5. The method of claim 1, wherein:
   the email file represents a plurality of email communications in an email thread;
   determining the selection indicates selection of an icon representing the first email communication; and
   presenting the indication includes an identification of at least one other participant in the email thread who did not send or receive the first email communication.

6. The method of claim 1, further comprising:
   rendering, by the computing system, the graphical representation to indicate that a first individual who sent the first email communication is included in a first category and that a second individual who received the first email communication is included in a second category so as to enable a user to select the icon based on knowledge that the first individual is in the first category and the second individual is in the second category.

7. The method of claim 6, wherein:
   rendering the graphical representation further comprises causing a first set of one or more icons corresponding to individuals in the first category to appear in a different region of the graphical representation than a second set of one or more icons corresponding to individuals in the second category so as to enable the user to select the icon based on knowledge that the first individual is in the first category and the second individual is in the second category.

8. The method of claim 7, wherein the first and second categories of individuals correspond, respectively, to first and second roles in a business organization, and the method further comprises:
   obtaining, from a source external to the email file, information indicating that the first individual has the first role and the second individual has the second role;
   indicating, on the graphical representation, that the first set of one or more icons represents individuals having the first role; and
   indicating, on the graphical representation, that the second set of one or more icons represents individuals having the second role.

9. The method of claim 1, wherein:
   determining the selection indicates selection of an icon representing the first email communication; and
   presenting the indication further includes an identification of a second email file corresponding to the first email communication.

10. The method of claim 9, further comprising:
    determining that the selection of the icon representing the first email communication further indicates that the second email file is to be accessed;
    retrieving the second email file from a first data store associated with a first individual who sent the first email communication or from a second data store associated with a second individual who received the first email communication; and
    opening the second email file in a new window of the display screen.

11. The method of claim 1, wherein determining the selection indicates selection of an icon indicating that an email corresponding to the first email communication that is to be replied to or forwarded, and the method further comprises:
    retrieving, from a first data store associated with a first individual who sent the first email communication or from a second data store associated with a second individual who received the first email communication, a second email file representing the first email communication;
    generating a third email file as a forwarded or reply version of the second email file; and
    opening the third email file in a new window of the display screen.

12. A system, comprising:
    at least one processor; and
    at least one computer-readable medium encoded with instructions which, when executed by the at least one processor, cause the system to:
        determine, based on contents of only a single email file, a first email communication represented in the email file and a second email communication represented in the email file, the second email communication being different than the first email communication, present, by a display screen, a graphical user interface including a graphical representation of at least the first email communication and the second email communication, the graphical representation including a plurality of icons, determine a selection of an icon from among the plurality of icons, determine that at least a first portion of the contents has a first relationship with the selected icon, and present, based at least in part on determining that the first portion has the first relationship with the selected icon, an indication on the display screen corresponding to the first portion.

13. The system of claim 12, wherein the at least one computer-readable medium is encoded with additional instructions which, when executed by the at least one processor, further cause the system to:

determine that a characteristic of the first email communication, a first individual who sent the first email communication, or a second individual who received the first email communication satisfies a first criterion; and include, in the graphical representation, a feature indicating that the characteristic of the first individual, the second individual, or the first email communication satisfies the first criterion.

14. The system of claim 13, wherein:

the first criterion is that the first email communication includes at least one keyword; and the feature indicates that the first email communication includes the at least one keyword.

15. The system of claim 13, wherein:

the first criterion is that the first individual is a person operating the graphical user interface; and the feature indicates that an icon representing the first individual represents the person operating the graphical user interface.

16. The system of claim 13, wherein:

the first criterion is that the first individual is unavailable; and the feature indicates the first individual represented is unavailable.

17. The system of claim 13, wherein:

the first criterion is that the first email communication is not associated with a reply email communication from the second individual; and the feature indicates that the second individual has not replied to the first email communication.

18. The system of claim 12, wherein the email file represents a plurality of email communications in an email thread, and the at least one computer-readable medium is encoded with additional instructions which, when executed by the at least one processor, further cause the system to:

determine selection of an icon representing a first individual who sent the first email communication;

determine that the first portion has the first relationship with the selected icon at least in part by determining that one or more of the plurality of email communications were sent or received by the first individual; and present the indication on the display screen at least in part by indicating that the one or more of the plurality of email communications were sent or received by the first individual.

19. The system of claim 12, wherein the email file represents a plurality of email communications in an email thread, and the at least one computer-readable medium is encoded with additional instructions which, when executed by the at least one processor, further cause the system to:

determine selection of an icon representing a first individual who sent the first email communication;

determine that the first portion has the first relationship with the selected icon at least in part by determining that the first individual also sent or received one or more of the plurality of email communications other than the first email communication; and present the indication on the display screen at least in part by identifying one or more additional icons representing the first individual.

20. At least one non-transitory computer-readable medium encoded with instructions which, when executed by at least one processor of a computing system, cause the computing system to:

determine, based on contents of only a single email file, a first email communication represented in the email file and a second email communication represented in the email file, the second email communication being different than the first email communication;

present, by a display screen, a graphical user interface including a graphical representation of at least the first email communication and the second email communication, the graphical representation including a plurality of icons;

determine a selection of an icon from among the plurality of icons;

determine that at least a first portion of the contents has a first relationship with the selected icon; and present, based at least in part on determining that the first portion has the first relationship with the selected icon, an indication on the display screen corresponding to the first portion.

* * * * *